United States Patent
Yoneyama et al.

(10) Patent No.: US 7,524,553 B2
(45) Date of Patent: Apr. 28, 2009

(54) OPTICAL FILM, POLARIZING PLATE AND IMAGE DISPLAY USING THE SAME

(75) Inventors: Hiroyuki Yoneyama, Minami-Ashigara (JP); Katsumi Inoue, Minami-Ashigara (JP); Akira Ikeda, Minami-Ashigara (JP); Satomi Suzuki, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 0 days.

(21) Appl. No.: 11/628,029

(22) PCT Filed: May 25, 2005

(86) PCT No.: PCT/JP2005/009566

§ 371 (c)(1), (2), (4) Date: Nov. 30, 2006

(87) PCT Pub. No.: WO2005/116694

PCT Pub. Date: Dec. 8, 2005

(65) Prior Publication Data

US 2007/0248828 A1 Oct. 25, 2007

(30) Foreign Application Priority Data

May 31, 2004 (JP) .............................. 2004-161305

(51) Int. Cl.
*B32B 7/00* (2006.01)
*B32B 27/08* (2006.01)
*B32B 27/18* (2006.01)
*B32B 27/20* (2006.01)
*B32B 27/28* (2006.01)

(52) U.S. Cl. ................. 428/212; 428/213; 428/323; 428/328; 428/329; 428/331; 428/332; 428/336; 428/339; 428/403; 428/421; 428/447; 428/1.5; 428/1.53; 359/601; 359/580; 359/586; 349/96; 349/137

(58) Field of Classification Search .................. None
See application file for complete search history.

(56) References Cited

U.S. PATENT DOCUMENTS 5,116,644 A * 5/1992 Asai et al. .................... 427/164

(Continued)

FOREIGN PATENT DOCUMENTS

EP         1 154 288         * 11/2001

(Continued)

*Primary Examiner*—Vivian Chen
(74) *Attorney, Agent, or Firm*—Buchanan Ingersoll & Rooney PC

(57) ABSTRACT

An object of the present invention is to provide an optical film assured of reflectance low enough to suppress glaring and excellent in the scratch resistance, antifouling property and antistatic property, and another object is to provide a polarizing plate and a display, using such an antireflection film. These objects can be attained by an optical film, particularly, an antireflection film, containing a support and a thin film layer formed by coating a composition containing fine particles and a binder, in which the SP value ((B/A)×100)) which is a ratio of an average particle filling factor (B) in the region of 30% of the film thickness on the upper side opposite the support to an average particle filling factor (A) in the entirety of the thin film layer is 90% or less; and a polarizing plate and an image display, using the optical film.

15 Claims, 3 Drawing Sheets

SUPPORT SIDE

SP VALUE 0%

SA VALUE 0%

U.S. PATENT DOCUMENTS

| | | | |
|---|---|---|---|
| 6,936,313 B2 * | 8/2005 | Sakata et al. | 428/1.53 |
| 2001/0053438 A1 * | 12/2001 | Nishida et al. | 428/212 |
| 2006/0269731 A1 * | 11/2006 | Yoshikawa et al. | 428/212 |
| 2007/0047087 A1 * | 3/2007 | Fukuda et al. | 359/582 |

FOREIGN PATENT DOCUMENTS

| | | | |
|---|---|---|---|
| JP | 7-134955 A | | 5/1995 |
| JP | 8-250044 A | | 9/1996 |
| JP | 11-189621 A | | 7/1999 |
| JP | 11-228631 A | | 8/1999 |
| JP | 2000-313709 A | | 11/2000 |
| JP | 2001-350001 A | | 12/2001 |
| JP | 2003-34761 A | | 2/2003 |
| JP | 2003-41152 A | | 2/2003 |
| JP | 2003-222704 A | | 8/2003 |
| JP | 2003-248101 A | | 9/2003 |
| JP | 2004-034399 | * | 2/2004 |
| JP | 2004-34399 A | | 2/2004 |
| JP | 2004-117852 A | | 4/2004 |
| JP | 2006-251666 | * | 8/2006 |

* cited by examiner

SUPPORT SIDE

SP VALUE 0%

SA VALUE 0%

SUPPORT SIDE

SP VALUE 60%

SA VALUE 31%

SUPPORT SIDE

SP VALUE 150%

SA VALUE 79%

OPTICAL FILM, POLARIZING PLATE AND IMAGE DISPLAY USING THE SAME

TECHNICAL FIELD

The present invention relates to an optical film, particularly, an antireflection film, and also relates to a polarizing plate and an image display.

BACKGROUND ART

In the case of blending fine particles and a binder and using the blend for usage such as adhesive, exterior paint, hardcoat and antireflection film, studies are being made to enhance scratch resistance, strength of the cured product, adhesion to another material contacted, and the like.

In blending fine particles and a binder, it is necessary not to cause unnecessary aggregation of an inorganic material of the fine particles. One of the methods employed in general is a method of dispersing fine particles in a solvent having affinity for a binder, mixing the dispersion with a binder, and forming a film. In order to obtain a stable performance, the matter of importance is that the fine particles are stably dispersed in the solvent. Specifically, control of hydrophilicity, hydrophobicity or steric hindrance on the fine particle surface is important and in the case of inorganic oxide fine particles, a surface treatment with alkoxysilane is known. For example, Non-Patent Document 1 describes a method of dispersing inorganic particles in an organic solvent by using a silane coupling agent.

After a coating composition containing fine particles and a binder can be stably prepared, the composition is coated on a support for the purpose of achieving a desired performance. If the state of the fine particles in the coating film cannot be controlled, the objective performance such as scratch resistance, strength of the cured product, and adhesion to another material contacted may fluctuate. In particular, the coating composition containing fine particles having a particle size of 1 μm or less has a large specific area and therefore, aggregation is liable to occur in the process of drying the organic solvent due to strong interaction between fine particles. As a result, aggregation or phase separation may be caused in the coating film and this may adversely affect the performance of the coating film.

On the other hand, in a display such as cathode ray tube display (CRT), plasma display panel (PDP), electroluminescent display (ELD) and liquid crystal display (LCD), an antireflection film is generally disposed on the outermost surface of the display so as to reduce the reflectance by utilizing the principle of optical interference and thereby prevent the reduction in contrast due to reflection of outside light or projection of an image.

Such an antireflection film can be produced by forming a low refractive index layer having a proper thickness on the outermost surface and depending on the case, appropriately forming a high refractive index layer, a medium refractive index layer, a hardcoat layer and the like between the low refractive index layer and the support. In order to realize a low reflectance, a material having a refractive index as low as possible is preferably used for the low refractive index layer. Furthermore, since the antireflection film is used on the outermost surface, this film is expected to function as a protective film of the display and required to allow for less attachment of dirt or dust and have high scratch resistance. In order to realize high scratch resistance of a thin film having a thickness of around 100 nm, strength of the film itself and firm adhesion to the underlying layer are necessary.

The means for reducing the refractive index of a material includes introduction of a fluorine atom and reduction of the density (introduction of voids), but either means tends to impair the film strength and adhesion and decrease the scratch resistance. Thus, it has been difficult to achieve both low refractive index and high scratch resistance.

Patent Documents 1 to 3 describe a technique of introducing a polysiloxane structure into a fluorine-containing polymer, thereby decreasing the coefficient of friction on the film surface and improving the scratch resistance. This means is effective to a certain extent for the improvement of scratch resistance, but in the case of a film substantially lacking in the film strength and interface adhesion, sufficiently high scratch resistance cannot be obtained only by this means.

Patent Document 4 describes a technique of adding a silane coupling agent to a low refractive index layer material utilizing a fluorine-containing polymer, thereby greatly improving the scratch resistance. However, the silane coupling agent having a low boiling point disadvantageously volatilizes and dissipates in the coating and drying steps and needs to be added in an excess amount by taking into account the volatilization loss. Thus, there is a problem that a stable performance is difficult to obtain.

The related arts of the present invention are as follows.

Non-Patent Document 1: Ganryo Bunsan Gijutsu, Hyomen Shori to Bunsanzai no Tukaikata Oyobi Bunsansei Hyoka (Pigment Dispersion Technology, Use of Surface Treatment and Dispersant, and Evaluation of Dispersibility), compiled by Technical Information Institute Co., Ltd. (1999)

Patent Document 1: JP-A-11-189621 (the term "JP-A" as used herein means an "unexamined published Japanese patent application")

Patent Document 2: JP-A-11-228631

Patent Document 3: JP-A-2000-313709

Patent Document 4: JP-A-2003-222704

DISCLOSURE OF THE INVENTION

Problems to be Solved by the Invention

An object of the present invention is to provide an optical film assured of reflectance low enough to suppress glaring and excellent in the scratch resistance, antifouling property and antistatic property. Another object of the present invention is to provide a polarizing plate and a display, using such an antireflection film.

Means to Solve the Problems

As a result of intensive investigations, the present inventors have found that an effects of the present invention can be obtained by the following means.

(1) An optical film comprising: a support; and a thin film layer formed by coating a composition containing fine particles and a binder, wherein a SP value ((B/A)×100)), which is a average ratio of an average particle filling factor (B) to average particle filling factor (A), is 90% or less, wherein the average particle filling factor (A) is an average particle filling factor in the entirety of the thin film layer, and the average particle filling factor (B) is an average particle filling factor in a region of 30% of a film thickness of the thin film layer on the upper side opposite the support.

(2) The optical film as described in (1) above, wherein in the region of 30% of the film thickness on the upper side opposite the support, a percentage (SA value) of a region containing a fine particle aggregate is 45% or less.

(3) The optical film as described in (1) or (2) above, wherein the fine particles are inorganic oxide fine particles, and surfaces of the fine particle are treated with a compound capable of forming a covalent bond with the fine particles.

(4) The optical film as described in any one of (1) to (3) above, wherein the fine particles mainly comprise at least one selected from the group consisting of silicon dioxide, tin oxide, indium oxide, zinc oxide, zirconium oxide and titanium oxide.

(5) The optical film as described in any one of (1) to (4) above, wherein the fine particles are hollow silica.

(6) The optical film as described in any one of (1) to (5) above, wherein the fine particles comprise a mixture of at least one fine particle having a refractive index of 1.60 to 2.60 and at least one fine particle having a refractive index of 1.15 to less than 1.60.

(7) The optical film as described in any one of (1) to (6) above, wherein the binder comprises at least one photopolymerizable compound.

(8) The optical film as described in any one of (1) to (7) above, wherein the binder comprises a thermosetting resin.

(9) The optical film as described in any one of (1) to (8) above, wherein the binder comprises at least a compound containing one of fluorocarbon and dimethylsiloxane.

(10) The optical film as described in any one of (1) to (9) above, wherein the binder comprises at least one polymerizable composition having a weight average molecular weight of 5,000 or more and at least one polymerizable composition having a weight average molecular weight of less than 5,000.

(11) A multilayer antireflection film which is an optical film described in any one of (1) to (10) above, wherein the support is a transparent support, and the optical film is obtained by stacking at least a hardcoat layer and a low refractive index layer on the support.

(12) A multilayer antireflection film which is the optical film described in any one of (1) to (11) above, wherein at least one antistatic layer is provided between a low refractive index layer and the support.

(13) A method for producing an optical film described in any one of (1) to (12) above, wherein the coating composition comprising fine particles and the binder comprises at least two volatile solvents.

(14) A polarizing plate comprising an optical film described in any one of (1) to (12) above.

(15) An image display comprising an optical film described in any one of (1) to (12) above.

EFFECTS OF THE INVENTION

An optical film of the present invention is assured of reflectance low enough to suppress glaring and excellent in the scratch resistance, antifouling property and antistatic property. Also, a display comprising the optical film of the present invention or a polarizing plate using an optical film of the present invention has the above-described properties, less causes reflection of outside light or projection of surrounding scenes, and ensures very high visibility.

DESCRIPTION OF REFERENCE NUMERAL

1 Fine particle

BEST MODE FOR CARRYING OUT THE INVENTION

Figure 1:
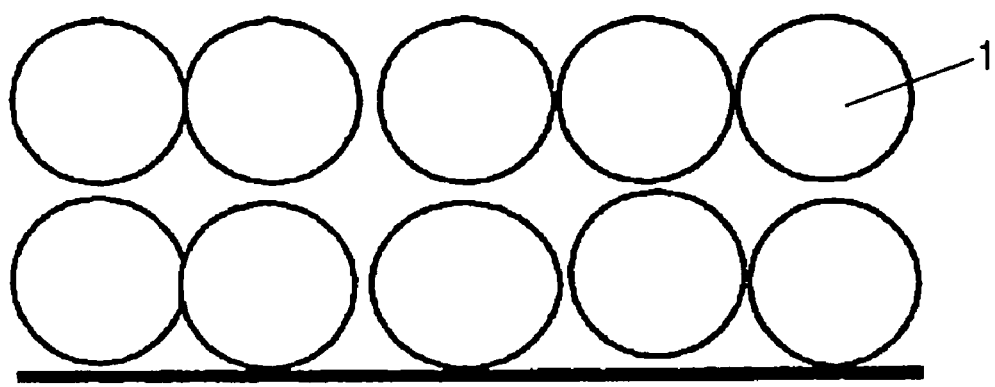
FIG. 1 is one example of the thin film layer in an optical film of the present invention.

The present invention is described in detail below. Incidentally, the term "from (numerical value 1) to (numerical value 2)" as used in the present invention for expressing a physical value, a characteristic value or the like means "(numerical value 1) or more and (numerical value 2) or less".

(Distribution of Particle in Layer)

The optical film of the present invention is characterized in that a thin film layer is formed by coating a composition containing fine particles and a binder on a support and the SP value ((B/A)×100)) which is a ratio of an average particle filling factor (B) in the region of 30% of the film thickness on the upper side opposite the support to an average particle filling factor (A) in the entirety of said thin film layer is 90% or less. The average particle filling factor (A) as used in the present invention is determined by the following method. An optical film is sliced into a thickness of 50 nm, its cross-section is photographed for 5 view fields at a magnification of 150,000 by using a transmission electron microscope, the number of particles is counted over the width as long as 50 times the layer thickness, and the number of particles per unit area in the thin film layer is calculated on the cross-sectional photograph and used as an average particle filling factor (A). The average particle filling factor (B) in the region of 30% of the film thickness on the upper side opposite the support is also calculated in the same manner as the average particle filling factor (A). Also, for example, when the particle is partially contained in the region of 30% of the film thickness on the upper side of the thin film layer, the number of particles is calculated by multiplying the ratio of the area of the particle contained in that region on the cross-sectional photograph. That is, when 70% of the area of a certain particle is contained in the region of 30% of the film thickness on the upper side, this is counted as 0.7 particle. Furthermore, when the particle is observed in the overlapped state on the cross-sectional photograph of the 50 nm-thick sliced specimen, the overlapped portion is also counted. In this case, the distribution of particles in the layer has no directionality in the plane direction of the layer, and the average particle filling factor can be determined based on the number of particles counted in a specific cross-section selected as a sliced specimen.

In the present invention, the SP value is, in view of the scratch resistance, preferably from 0 to 90%, more preferably from 0 to 70%, and most preferably from 0 to 40%.

Particularly, in the case of using the optical film as a film for the outermost surface, the SA value defined below is preferably 45% or less in view of the antifouling property. The SA value is defined as a ratio of a region comprising a particle aggregate to the entirety in the region of 30% of the film thickness on the upper side opposite the support. The SA value is calculated, similarly to the calculation of the SP value, by slicing an optical film into a thickness of 50 nm and photographing its cross-section at a magnification of 150,000 with use of a transmission electron microscope. In the present invention, the aggregate means a state where two or more particles are abuttedly present. That is, the SA value is determined as a percentage of the area of a portion corresponding to the aggregate in the photograph of the sliced specimen based on the area of the entire photograph of the sliced specimen. The SA value is preferably from 0 to 45%, more preferably from 0 to 35%, and most preferably from 0 to 25%.

Figure 2:
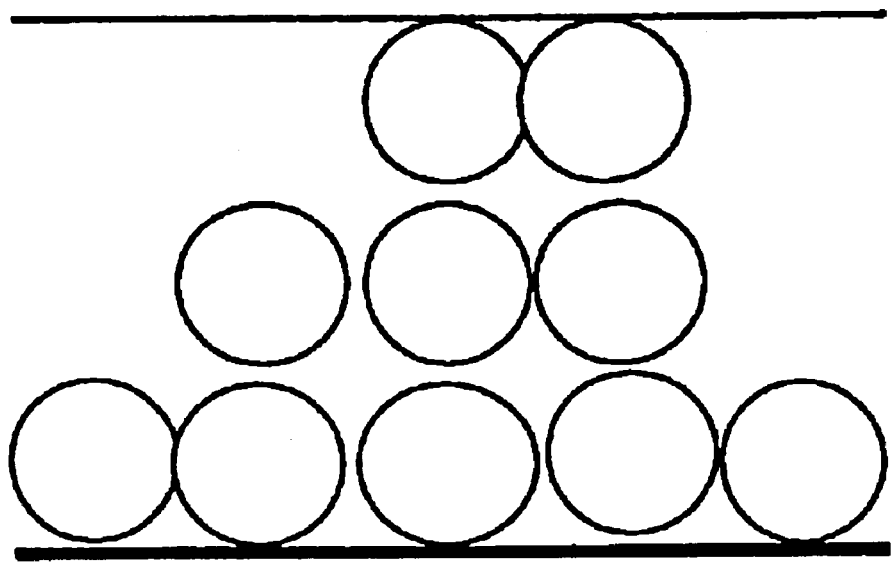
FIG. 2 is one example of the thin film layer in an optical film of the present invention.
Figure 3:
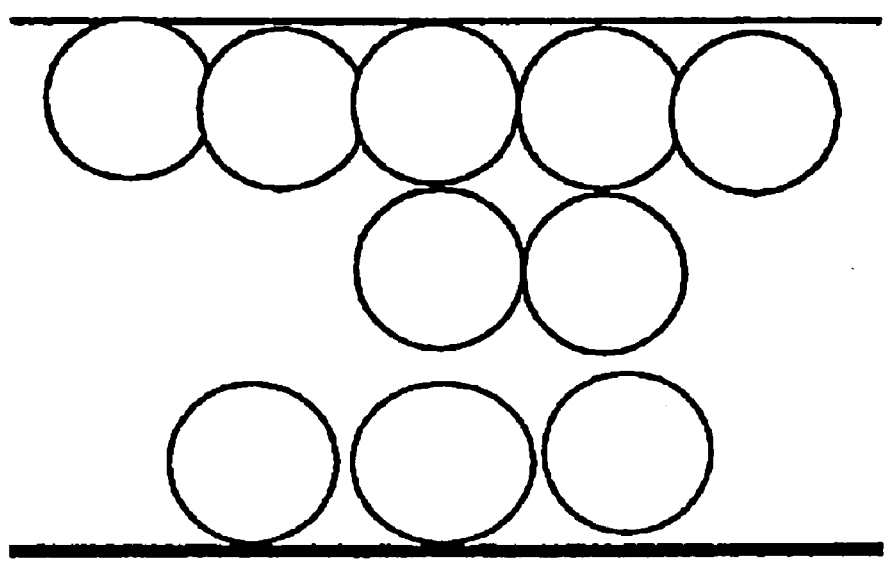
FIG. 3 is one example of the thin film layer in a comparative optical film.

FIGS. 1 to 3 are cross-sectional schematic views showing representative distributions in the thin film layer.

In the present invention, the ratio by mass of the fine particles to the entire solid content in the thin film layer containing the fine particles and the binder is preferably from 2 to 85%, more preferably from 5 to 80%, and most preferably from 20 to 75%. If this ratio is excessively large, the film becomes brittle, whereas if it is too small, the original purpose of adding fine particles cannot be exerted. In the present invention, the thickness of the thin film layer is preferably from 10 to 5,000 nm, more preferably from 10 to 500 nm, and most preferably from 20 to 300 nm. The layer is preferably a low refractive index layer, and the binder preferably contains at least a compound containing a fluorocarbon or dimethylsiloxane moiety. Also, when a coating composition containing this binder and an electrically conducting fine particles is coated and the electrically conducting fine particles is caused to segregate to the lower part, the coating of two layers which need to be coated as separate layers under normal circumstances can be performed by one coating operation and this is particularly preferred.

The treatment for improving dispersibility of the fine particles in the thin film layer is describe below. In the present invention, the fine particles are preferably inorganic fine particles, more preferably inorganic oxide fine particles.

The inorganic oxide fine particles are preferably used after subjecting the inorganic oxide fine particles to a dispersibility improving treatment with a hydrolysate of an organosilane represented by the following formula (I) and/or a partial condensate thereof, and at the treatment for improving dispersibility of the inorganic oxide fine particles, either one or both of an acid catalyst and a metal chelate compound are preferably used.

The dispersibility improving treatment is performed by contacting an organosilane, inorganic oxide fine particles and, if desired, water in the presence of at least either one of a catalyst having a hydrolysis function and a metal chelate compound having a condensation function. The organosilane may be partially hydrolyzed and may be subjected to partial condensation. The organosilane is hydrolyzed and subsequently partially condensed, and this partial condensate modifies the surface of the inorganic oxide fine particles to enhance the dispersibility, whereby a stable liquid dispersion of the inorganic oxide fine particles can be obtained.

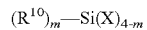  Formula (I)

(wherein $R^{10}$ represents a substituted or unsubstituted alkyl group or a substituted or unsubstituted aryl group, X represents a hydroxyl group or a hydrolyzable group, and m represents an integer of 1 to 3).

Metal Chelate Compound:

At least one metal chelate compound where the ligands are an alcohol represented by the formula $R^3OH$ (wherein $R^3$ represents an alkyl group having a carbon number of 1 to 10) and a compound represented by the formula $R^4COCH_2COR^5$ (wherein $R^4$ represents an alkyl group having a carbon number of 1 to 10, and $R^5$ represents an alkyl group having a carbon number of 1 to 10 or an alkoxy group having a carbon number of 1 to 10) and the center metal is a metal selected from Zr, Ti and Al.

(Organosilane Compound)

The organosilane compound for use in the present invention is described in detail.

  Formula (I)

In formula (I), $R^{10}$ represents a substituted or unsubstituted alkyl group or a substituted or unsubstituted aryl group. Examples of the alkyl group include a methyl group, an ethyl group, a propyl group, an isopropyl group, a hexyl group, a tert-butyl group, a sec-butyl group, a hexyl group, a decyl group and a hexadecyl group. The alkyl group is preferably an alkyl group having a carbon number of 1 to 30, more preferably from 1 to 16, still more preferably from 1 to 6. Examples of the aryl group include a phenyl group and a naphthyl group, with a phenyl group being preferred.

X represents a hydroxyl group or a hydrolyzable group. Examples of the hydrolyzable group include an alkoxy group (preferably an alkoxy group having a carbon number of 1 to 5, such as methoxy group and ethoxy group), a halogen atom (e.g., Cl, Br, I) and an $R^2COO$ group (wherein $R^2$ is preferably a hydrogen atom or an alkyl group having a carbon number of 1 to 5; e.g., $CH_3COO$, $C_2H_5COO$). Among these, an alkoxy group is preferred, and a methoxy group and an ethoxy group are more preferred.

m represents an integer of 1 to 3. When a plurality of $R^{10}$'s or X's are present, the plurality of $R^{10}$'s or X's may be the same or different. m is preferably 1 or 2, more preferably 1.

The substituent contained in $R^{10}$ is not particularly limited, but examples thereof include a halogen atom (e.g., fluorine, chlorine, bromine), a hydroxyl group, a mercapto group, a carboxyl group, an epoxy group, an alkyl group (e.g., methyl, ethyl, i-propyl, propyl, tert-butyl), an aryl group (e.g., phenyl, naphthyl), an aromatic heterocyclic group (e.g., furyl, pyrazolyl, pyridyl), an alkoxy group (e.g., methoxy, ethoxy, i-propoxy, hexyloxy), an aryloxy group (e.g., phenoxy), an alkylthio group (e.g., methylthio, ethylthio), an arylthio group (e.g., phenylthio), an alkenyl group (e.g., vinyl, 1-propenyl), an acyloxy group (e.g., acetoxy, acryloyloxy, methacryloyloxy), an alkoxycarbonyl group (e.g., methoxycarbonyl, ethoxycarbonyl), an aryloxycarbonyl group (e.g., phenoxycarbonyl), a carbamoyl group (e.g., carbamoyl, N-methylcarbamoyl, N,N-dimethylcarbamoyl, N-methyl-N-octylcarbamoyl) and an acylamino group (e.g., acetylamino, benzoylamino, acrylamino, methacrylamino). These substituents each may be further substituted. Incidentally, in the present invention, even when a single atom is substituted to the hydrogen atom, for the sake of convenience, this is referred to as a substituent.

When a plurality of $R^{10}$'s are present, at least one is preferably a substituted alkyl group or a substituted aryl group. In particular, the substituted alkyl group or substituted aryl group preferably further has a vinyl polymerizable group. In this case, the compound represented by formula (I) may be expressed as a vinyl polymerizable substituent-containing organosilane compound represented by the following formula (II).

Formula (II):

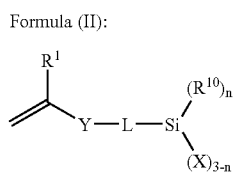

In formula (II), $R^1$ represents a hydrogen atom, a methyl group, a methoxy group, an alkoxycarbonyl group, a cyano group, a fluorine atom or a chlorine atom. Examples of the alkoxycarbonyl group include a methoxycarbonyl group and an ethoxycarbonyl group. $R^1$ is preferably a hydrogen atom, a methyl group, a methoxy group, a methoxycarbonyl group, a cyano group, a fluorine atom or a chlorine atom, more preferably a hydrogen atom, a methyl group, a methoxycarbonyl group, a fluorine atom or a chlorine atom, still more preferably a hydrogen atom or a methyl group.

Y represents a single bond, an ester group, an amido group, an ether group or a urea group. Y is preferably a single bond, an ester group or an amido group, more preferably a single bond or an ester group, still more preferably an ester group.

L represents a divalent linking chain. L is specifically a substituted or unsubstituted alkylene group, a substituted or unsubstituted arylene group, a substituted or unsubstituted alkylene group having in the inside thereof a linking group (e.g., ether, ester, amido), or a substituted or unsubstituted arylene group having in the inside thereof a linking group, preferably a substituted or unsubstituted alkylene group having a carbon number of 2 to 10, a substituted or unsubstituted arylene group having a carbon number of 6 to 20, or an alkylene group having in the inside thereof a linking group and having a carbon number of 3 to 10, more preferably an unsubstituted alkylene group, an unsubstituted arylene group or an alkylene group having in the inside thereof an ether or ester linking group, still more preferably an unsubstituted alkylene group or an alkylene group having in the inside thereof an ether or ester linking group. Examples of the substituent include a halogen, a hydroxyl group, a mercapto group, a carboxyl group, an epoxy group, an alkyl group and an aryl group. These substituents each may be further substituted.

n represents 0 or 1. When a plurality of X's are present, the plurality of X's may be the same or different. n is preferably 0.

$R^{10}$ has the same meaning as $R^{10}$ in formula (I) and is preferably a substituted or unsubstituted alkyl group or an unsubstituted aryl group, more preferably an unsubstituted alkyl group or an unsubstituted aryl group.

X has the same meaning as X in formula (I) and is preferably a halogen, a hydroxyl group or an unsubstituted alkoxy group, more preferably chlorine, a hydroxyl group or an unsubstituted alkoxy group having a carbon number of 1 to 6, still more preferably a hydroxyl group or an alkoxy having a carbon number of 1 to 3, yet still more preferably a methoxy group.

The organosilane compound for use in the present invention is preferably an organosilane compound represented by the following formula (III).

$$(Rf-L_1)_n\text{-Si}(R^{11})_{n-4} \qquad \text{Formula (III)}$$

In the formula above, Rf represents a linear, branched or cyclic fluorine-containing alkyl group having a carbon number of 1 to 20 or a fluorine-containing aromatic group having a carbon number of 6 to 14. Rf is preferably a linear, branched or cyclic fluoroalkyl group having a carbon number of 3 to 10, more preferably a linear fluoroalkyl group having a carbon number of 4 to 8. $L_1$ represents a divalent linking group having a carbon number of 10 or less, preferably an alkylene group having a carbon number of 1 to 10, more preferably an alkylene group having a carbon number of 1 to 5. The alkylene group is a linear or branched, substituted or unsubstituted alkylene group which may have a linking group (e.g., ether, ester, amido) in the inside. The alkylene group may have a substituent and in this case, preferred examples of the substituent include a halogen atom, a hydroxyl group, a mercapto group, a carboxyl group, an epoxy group, an alkyl group and an aryl group. $R^{11}$ represents a hydroxyl group or a hydrolyzable group, preferably an alkoxy group having a carbon number of 1 to 5 or a halogen atom, more preferably a methoxy group, an ethoxy group or a chlorine atom. n represents an integer of 1 to 3.

Among the fluorine-containing silane coupling agents represented by formula (III), preferred is a fluorine-containing silane coupling agent represented by the following formula (IV):

$$C_nF_{2n+1}-(CH_2)_m-\text{Si}(R)_3 \qquad \text{Formula (IV)}$$

wherein n represents an integer of 1 to 10, m represents an integer of 1 to 5, and R represents an alkoxy group having a carbon number of 1 to 5 or a halogen atom. n is preferably an integer of 4 to 10, m is preferably an integer of 1 to 3, and R is preferably a methoxy group, an ethoxy group or a chlorine atom.

Two or more kinds of the compounds represented by formula (I) may be used in combination. Specific examples of the compound represented by formula (I) are set forth below, but the present invention is not limited thereto.

M-1

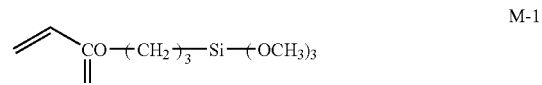

M-2

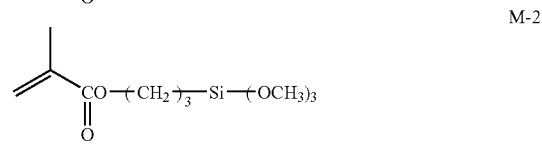

M-3

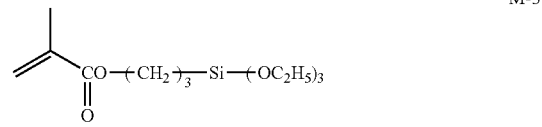

M-4

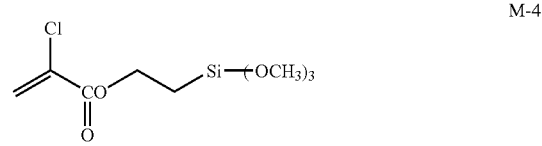

M-5

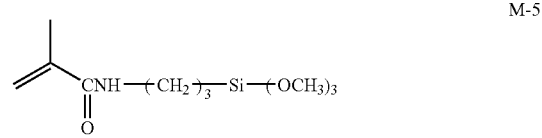

M-6

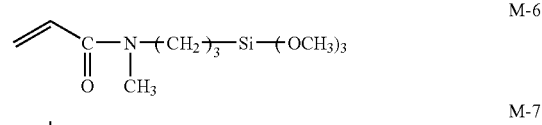

M-7

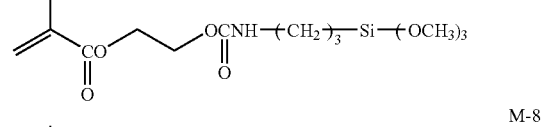

M-8

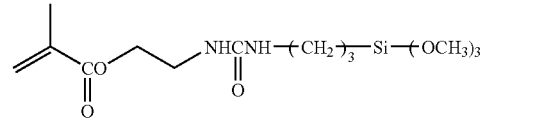

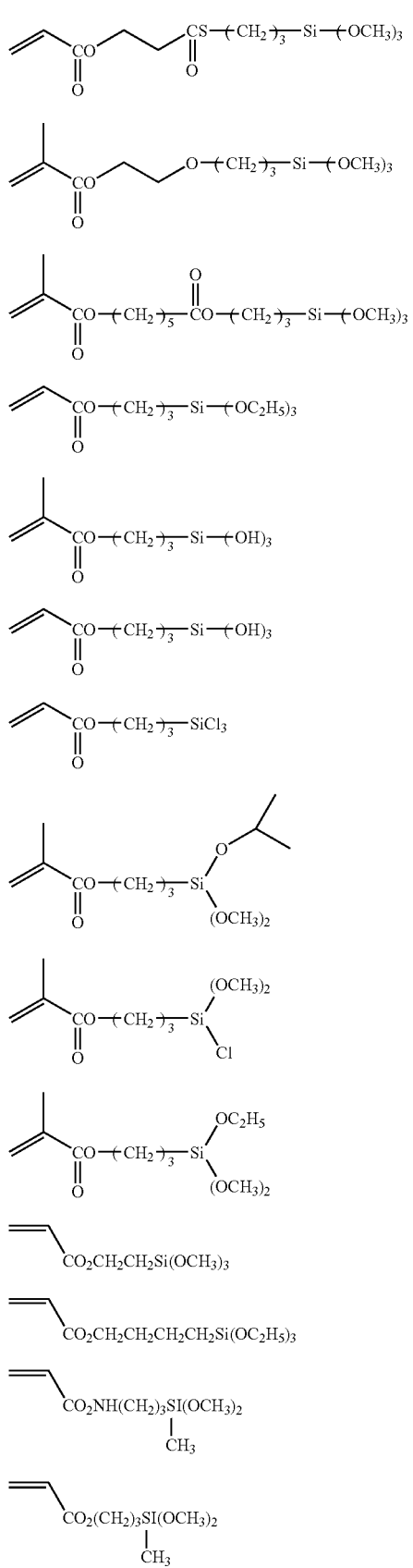
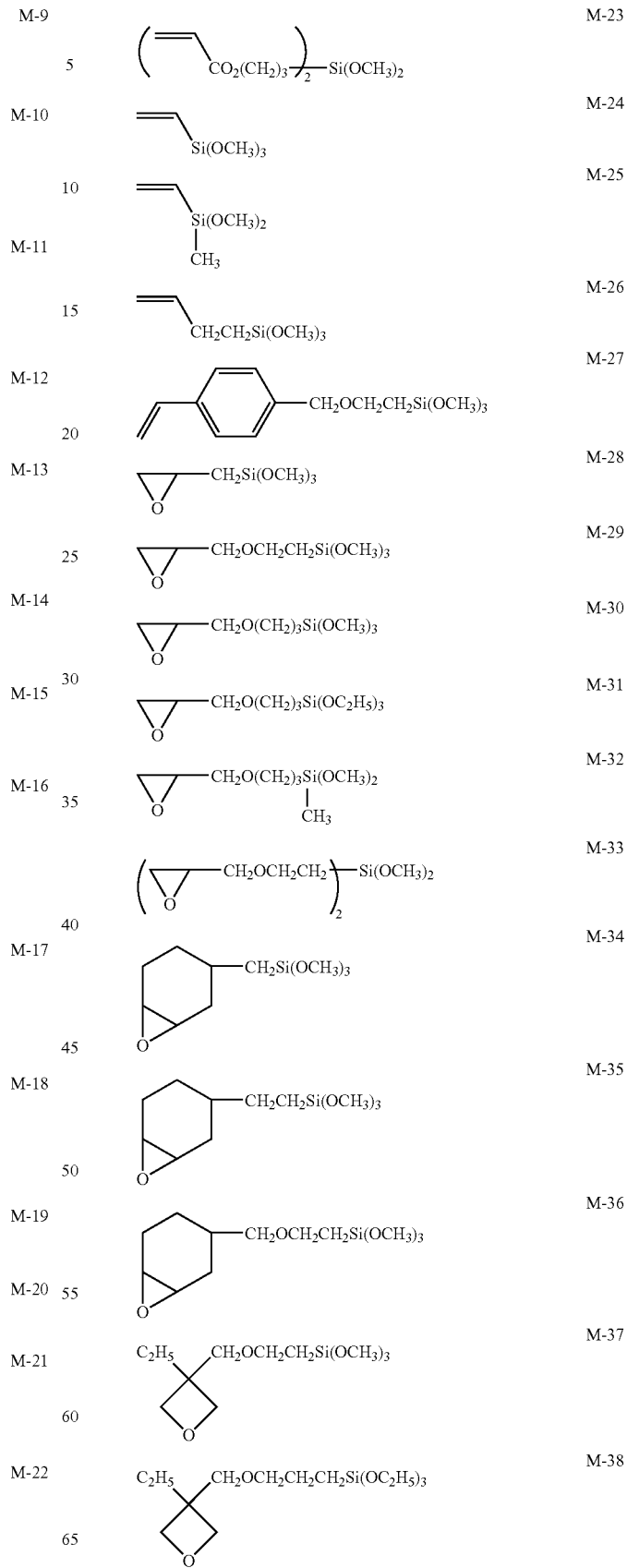

| | |
|---|---|
| HO-C(=O)-CH₂CH₂Si(OCH₃)₃ | |
| NH₂CH₂CH₂CH₂Si(OCH₃)₃ | M-39 |
| HS-CH₂CH₂CH₂Si(OCH₃)₃ | M-40 |
| CH₃Si(OCH₃)₃ | M-41 |
| CH₃Si(OC₂H₅)₃ | M-42 |
| C₂H₅Si(OCH₃)₃ | M-43 |
| t-C₄H₉Si(OCH₃)₃ | M-44 |
| Ph-CH₂Si(OCH₃)₃ | M-45 |
| CH₂=CH-C₆H₄-Si(OCH₃)₃ | M-46 |
| Ph-NH(CH₃)₃Si(OCH₃)₃ | M-47 |
| (CH₃)₃SiOCH₃ | M-48 |
| (CH₃)₃SiCl | M-49 |
| (CH₃)₃SiNHSi(CH₃)₃ | M-50 |
| C₁₈H₃₇Si(OCH₃)₃ | M-51 |
| (CH₃CH₂)₂N(CH₂)₃Si(OCH₃)₃ | M-52 |
| CH₃(CH₂)₁₇-N⁺(CH₃)₂-(CH₂)₃Si(OCH₃)₃ Cl⁻ | M-53 |
| C₃H₇CH₂CH₂Si(OC₂H₅)₃ | M-54 |
| C₆F₁₃CH₂CH₂Si(OCH₃)₃ | M-55 |
| C₄F₉CH₂CH₂Si(OCH₃)₃ | M-56 |
| C₈F₁₇CH₂CH₂Si(OCH₃)₃ | M-57 |
| C₆F₁₃CH₂CH₂Si(OC₂H₅)₃ | M-58 |
| C₈F₁₇CH₂CH₂Si(OC₂H₅)₃ | M-59 |
| C₄F₉CH₂CH₂Si(OC₂H₅)₃ | M-60 |
| C₆F₁₃CH₂CH₂SiCl₃ | M-61 |
| C₈F₁₇CH₂CH₂SiCl₃ | M-62 |
| C₄F₉CH₂CH₂SiCl₃ | M-63 |
| C₆F₁₃CH₂CH₂Si(OCH₃)₂CH₃ | M-64 |
| C₆F₁₃CH₂CH₂CH₂Si(OCH₃)₃ | M-65 |
| C₄F₉CH₂CH₂CH₂Si(OCH₃)₃ | M-66 |
| C₈F₁₇CH₂CH₂CH₂CH₂Si(OCH₃)₃ | M-67 |
| C₆F₁₃CH₂Si(OC₂H₅)₃ | M-68 |
| C₈F₁₇CH₂CH₂Si(OC₄H₉)₃ | M-69 |
| C₄F₉CH₂CH₂CH₂Si(OCH₃)₃ | M-70 |
| C₆F₁₃CH₂CH₂Si(OCH₃)₂Br | M-71 |
| C₈F₁₇CH₂CH₂CH₂Si(OCH₃)₂Cl | M-72 |
| C₄F₉CH₂CH₂Si(CH₃)₂OCH₃ | M-73 |
| C₆F₁₃CH₂CH₂Si(OCH₃)Cl₂ | M-74 |
| (CF₃)₂CFCF₂CF₂CH₂CH₂Si(OCH₃)₃ | M-75 |
| (C₄F₉)₂CFCH₂CH₂Si(OCH₃)₃ | M-76 |
| (C₆F₁₃)₂CFCH₂CH₂Si(OCH₃)₃ | M-77 |
| (CF₃)₃CCF₂CH₂CH₂Si(OCH₃)₃ | M-78 |
| (C₄F₉)₃CCH₂CH₂Si(OCH₃)₃ | M-79 |
| (CF₃)₂CFOCH₂CH₂CH₂Si(OC₂H₅)₃ | M-80 |
| (CF₃)₂CFOCH₂CH₂CH₂SiCl₃ | M-81 |
| H(CF₂)₆CH₂Si(OCH₃)₃ | M-82 |
| H(CF₂)₄CH₂Si(OCH₃)₃ | M-83 |
| H(CF₂)₈CH₂Si(OCH₃)₃ | M-84 |
| C₆F₅-CH₂CH₂CH₂Si(OCH₃)₃ | M-85 |
| C₆F₅-CH₂CH₂SiCl₃ | M-86 |
| C₆F₁₁-CH₂CH₂CH₂Si(OCH₃)₃ | M-87 |

Among these specific examples, (M-1), (M-2), (M-56), (M-57) and the like are preferred. Also, Compounds A, B and C described in Reference Examples of Japanese Patent 3,474, 330 are also preferred because of their excellent dispersion stability. In the present invention, the amount used of the organosilane compound represented by formula (I) is not particularly limited but is preferably from 1 to 300 mass %, more preferably from 3 to 100 mass %, and most preferably from 5 to 50 mass %, per the inorganic oxide fine particle.

Also, the amount used is preferably from 1 to 300 mol %, more preferably from 5 to 300 mol %, and most preferably from 10 to 200 mol %, per the normality concentration (formol) based on the hydroxyl group on the inorganic oxide surface.

When the amount of the organosilane compound used is within the above-described range, a satisfactory effect of stabilizing the liquid dispersion can be obtained and the film strength at the formation of a coating film increases. A plurality of organosilane compound species are preferably used in combination, and the plurality of compound species may be added at the same time or may be reacted by adding at different times. Also, when a plurality of compound species are previously formed into a partial condensate and the partial condensate is added, the control of reaction is facilitated and this is preferred.

In the present invention, a hydrolysate of the above-described organosilane and/or a partial condensate thereof is caused to act on the inorganic oxide fine particle surface, whereby the dispersibility of the inorganic oxide fine particle is improved.

The hydrolysis and condensation reaction is preferably performed by adding water in an amount of 0.3 to 2.0 mol, preferably from 0.5 to 1.0 mol, per mol of the hydrolyzable group (X) and stirring it at 15 to 100° C. in the presence of an acid catalyst or a metal chelate compound for use in the present invention.

(Solvent for Dispersibility Improving Treatment)

The dispersibility improving treatment with a hydrolysate of organosilane and/or a condensation reaction product thereof may be performed without a solvent or in a solvent. In the case of using a solvent, the concentration of the hydrolysate of organosilane and/or the partial condensate thereof may be appropriately selected. As for the solvent, an organic solvent is preferably used for uniformly mixing the components, and suitable examples thereof include alcohols, aromatic hydrocarbons, ethers, ketones and esters.

The solvent is preferably a solvent capable of dissolving the hydrolysate of organosilane and/or the condensation reaction product thereof and a catalyst. In view of the process, the organic solvent is preferably used as a coating solution or a part of a coating solution. Also, a solvent which does not impair the solubility or dispersibility when mixed with other materials such as fluorine-containing polymer is preferred.

Examples of the alcohols include a monohydric alcohol and a dihydric alcohol. The monohydric alcohol is preferably a saturated aliphatic alcohol having a carbon number of 1 to 8. Specific examples of these alcohols include methanol, ethanol, n-propyl alcohol, i-propyl alcohol, n-butyl alcohol, sec-butyl alcohol, tert-butyl alcohol, ethylene glycol, diethylene glycol, triethylene glycol, ethylene glycol monobutyl ether and ethylene glycol monoethyl ether acetate.

Specific examples of the aromatic hydrocarbons include benzene, toluene and xylene. Specific examples of the ethers include tetrahydrofuran and dioxane. Specific examples of the ketones include acetone, methyl ethyl ketone, methyl isobutyl ketone and diisobutyl ketone. Specific examples of the esters include ethyl acetate, propyl acetate, butyl acetate and propylene carbonate.

One of these organic solvents may be used alone or two or more species thereof may be used in combination. The concentration of organosilane based on the solvent in the treatment is not particularly limited but is usually from 0.1 to 70 mass %, preferably from 1 to 50 mass %.

In the present invention, it is preferred that the inorganic oxide fine particles dispersed with use of an alcohol-based solvent is subjected to a dispersibility improving treatment and subsequently, the dispersion solvent is displaced by an aromatic hydrocarbon solvent or a ketone-based solvent. From the standpoint of increasing the affinity for a binder used in combination at the coating or enhancing the stability of the dispersion itself, displacement by a ketone-based solvent is preferred.

(Catalyst for Dispersibility Improving Treatment)

The dispersibility improving treatment with a hydrolysate of organosilane and/or a condensation reaction product thereof is preferably performed in the presence of a catalyst. Examples of the catalyst include inorganic acids such as hydrochloric acid, sulfuric acid and nitric acid; organic acids such as oxalic acid, acetic acid, formic acid, methanesulfonic acid and toluenesulfonic acid; inorganic bases such as sodium hydroxide, potassium hydroxide and ammonia; organic bases such as triethylamine and pyridine; and metal alkoxides such as triisopropoxyaluminum and tetrabutoxyzirconium. In view of the production stability or storage stability of the inorganic oxide fine particle solution, an acid catalyst (inorganic acids, organic acids) and/or a metal chelate compound is used in the present invention. As for the inorganic acid, a hydrochloric acid and a sulfuric acid are preferred, and as for the organic acid, an organic acid having an acid dissociation constant (pKa value (25° C.)) of 4.5 or less in water is preferred. In particular, a hydrochloric acid, a sulfuric acid and an organic acid having an acid dissociation constant of 3.0 or less in water are preferred, a hydrochloric acid, a sulfuric acid and an organic acid having an acid dissociation constant of 2.5 or less in water are more preferred, and an organic acid having an acid dissociation constant of 2.5 or less in water is still more preferred. Among these, a methanesulfonic acid, an oxalic acid, a phthalic acid and a malonic acid are more preferred, and an oxalic acid is still more preferred.

In the case where the hydrolyzable group of the organosilane is an alkoxy group and the acid catalyst is an organic acid, the carboxyl group or sulfo group of the organic acid supplies a proton and therefore, the amount of water added can be decreased. The amount of water added is from 0 to 2 mol, preferably from 0 to 1.5 mol, more preferably from 0 to 1 mol, still more preferably from 0 to 0.5 mol, per mol of the alkoxide group of organosilane. In the case of using an alcohol as the solvent, substantially no addition of water is also preferred.

In the case where the acid catalyst is an inorganic acid, the amount of the acid catalyst used is from 0.01 to 10 mol %, preferably from 0.1 to 5 mol %, based on the hydrolyzable group. In the case where the acid catalyst is an organic acid, the optimum amount of the acid catalyst used varies depending on the amount of water added, but when water is added, the amount of the acid catalyst used is from 0.01 to 10 mol %, preferably from 0.1 to 5 mol %, based on the hydrolyzable group, and when water is not substantially added, the amount of the acid catalyst used is from 1 to 500 mol %, preferably from 10 to 200 mol %, more preferably from 20 to 200 mol %, still more preferably from 50 to 150 mol %, yet still more preferably from 50 to 120 mol %, based on the hydrolyzable group.

The treatment is performed with stirring at 15 to 100° C., but the conditions are preferably adjusted according to the reactivity of organosilane.

(Metal Chelate Compound)

As for the metal chelate compound, any metal chelate compound may be suitably used without particular limitation as long as an alcohol represented by the formula: $R^3OH$ (wherein $R^3$ represents an alkyl group having a carbon number of 1 to 10) and/or a compound represented by the formula: $R^4COCH_2COR^5$ (wherein $R^4$ represents an alkyl group having a carbon number of 1 to 10, and $R^5$ represents an alkyl group having a carbon number of 1 to 10 or an alkoxy group having a carbon number of 1 to 10) are present as the ligand and the center metal is a metal selected from Zr, Ti and Al. Within this scope, two or more kinds of metal chelate compounds may be used in combination. The metal chelate compound for use in the present invention is preferably selected from the group consisting of compounds represented by the formulae:

$$Zr(OR^3)_{p1}(R^4COCHCOR^5)_{p2},$$

$$Ti(OR^3)_{q1}(R^4COCHCOR^5)_{q2}, \text{ and}$$

$$Al(OR^3)_{r1}(R^4COCHCOR^5)_{r2}.$$

Such a compound has a function of accelerating the condensation reaction of the organosilane compound.

In the metal chelate compounds above, $R^3$ and $R^4$, which may be the same or different, each represents an alkyl group having a carbon number of 1 to 10, such as ethyl group, n-propyl group, i-propyl group, n-butyl group, sec-butyl group, tert-butyl group, n-pentyl group and phenyl group, and $R^5$ represents an alkyl group having a carbon number of 1 to 10 similarly to the above or an alkoxy group having a carbon number of 1 to 10, such as methoxy group, ethoxy group, n-propoxy group, i-propoxy group, n-butoxy group, sec-butoxy group and tert-butoxy group. Also, in the metal chelate compounds, p1, p2, q1, q2, r1 and r2 each represents an integer determined to give a tetradentate or hexadentate coordination.

Specific examples of these metal chelate compounds include a zirconium chelate compound such as tri-n-butoxyethylacetoacetate zirconium, di-n-butoxy-bis(ethyl-acetoacetate) zirconium, n-butoxy-tris(ethylacetoacetate)zirconium, tetrakis(n-propylacetoacetate) zirconium, tetrakis(acetylacetoacetate)zirconium and tetrakis-(ethylacetoacetate) zirconium; a titanium chelate compound such as diisopropoxy.bis (ethylacetoacetate)titanium, diisopropoxy.bis(acetylacetate) titanium and diisopropoxy.bis(acetylacetone)titanium; and an aluminum chelate compound such as diisopropoxyethylacetoacetate aluminum, diisopropoxyacetylacetonate aluminum, isopropoxybis(ethylacetoacetate)aluminum, isopropoxybis(acetylacetonate)aluminum, tris(ethylacetoacetate) aluminum, tris(acetylacetonate)aluminum and monoacetylacetonato. bis(ethylacetoacetate)aluminum.

Among these metal chelate compounds, preferred are tri-n-butoxyethylacetoacetate zirconium, diisopropoxybis(acetylacetonate)titanium, diisopropoxyethylacetoacetate aluminum and tris(ethylacetoacetate)aluminum. One of these metal chelate compounds may be used alone, or two or more species thereof may be used as a mixture. Furthermore, a partial hydrolysate of such a metal chelate compound may also be used.

In view of the condensation reaction rate and the film strength when a coating film is formed, the metal chelate compound for use in the present invention is preferably used at a proportion of 0.01 to 50 mass %, more preferably from 0.1 to 50 mass %, still more preferably from 0.5 to 10 mass %, based on the organosilane.

(Additive for Stabilizing Liquid Dispersion)

In addition to those organosilane, acid catalyst and/or chelate compound, the liquid dispersion or coating composition for use in the present invention preferably contains the following component (c).

The component (c) is desribed below. The component (c) for use in the present invention is a β-diketone compound and/or a β-ketoester compound, represented by the formula: $R^4COCH_2COR^5$, and such a compound acts as a stability enhancer of the liquid dispersion or coating composition for use in the present invention. More specifically, this component is considered to coordinate to a metal atom in the metal chelate compound (zirconium, titanium and/or aluminum compound) and thereby act to suppress the action of the metal chelate compound of accelerating the condensation reaction of the organosilane with the metal chelate component and enhance the storage stability of the composition obtained. $R^4$ and $R^5$ constituting the component (c) have the same meanings as $R^4$ and $R^5$ constituting the metal chelate compound above.

Specific examples of the β-diketone compound and/or β-ketoester compound as the component (c) include acetylacetone, methyl acetoacetate, ethyl acetoacetate, n-propyl acetoacetate, i-propyl acetoacetate, n-butyl acetoacetate, sec-butyl acetoacetate, tert-butyl acetoacetate, 2,4-hexanedione, 2,4-heptanedione, 3,5-heptanedione, 2,4-octanedione, 2,4-nonanedione and 5-methylhexanedione. Among these, ethyl acetoacetate and acetylacetone are preferred, and acetylacetone is more preferred. One of these β-diketone compounds and β-ketoester compounds may be used alone, or two or more species thereof may be used as a mixture. In the present invention, the P-diketone compound and/or β-ketoester compound as the component (c) is preferably used in an amount of 2 mol or more, more preferably from 3 to 20 mol, per mol of the metal chelate compound. If the amount added is less than 2 mol, the composition obtained may have poor storage stability and this is not preferred.

(Inorganic Oxide Fine Particle)

The inorganic oxide fine particle which can be used in the present invention is described below.

In view of the colorlessness of the cured film obtained from the curable composition, the inorganic oxide particle is preferably an oxide particle of at least one element selected from the group consisting of silicon, aluminum, zirconium, titanium, zinc, germanium, indium, tin, antimony and cerium.

Examples of the inorganic oxide particles include particles of silica, alumina, zirconia, titanium oxide, zinc oxide, germanium oxide, indium oxide, tin oxide, indium-tin oxide (ITO), antimony oxide and cerium oxide. Among these, particles of silica, alumina, zirconia and antimony oxide are preferred in the light of high hardness. One of these inorganic oxide particles may be used alone, or two or more species thereof may be used in combination. Furthermore, the inorganic oxide particle is preferably used in the form of an organic solvent dispersion. When using as an organic solvent dispersion, the dispersion medium is preferably an organic solvent in view of the compatibility with other components and dispersibility. Examples of such an organic solvent include alcohols such as methanol, ethanol, isopropanol, butanol and octanol; ketones such as acetone, methyl ethyl ketone, methyl isobutyl ketone and cyclohexanone; esters such as ethyl acetate, butyl acetate, ethyl lactate, γ-butyrolactone, propylene glycol monomethyl ether acetate and propylene glycol monoethyl ether acetate; ethers such as ethylene glycol monomethyl ether and diethylene glycol monobutyl ether; aromatic hydrocarbons such as benzene, toluene and xylene; and amides such as dimethylformamide, dimethylacetamide and N-methylpyrrolidone. Among these, preferred are methanol, isopropanol, butanol, methyl ethyl ketone, methyl isobutyl ketone, ethyl acetate, butyl acetate, toluene and xylene.

The number average particle diameter of the oxide particles is preferably from 1 to 2,000 nm, more preferably from 3 to 200 nm, still more preferably from 5 to 100 nm. If the number average particle diameter exceeds 2,000 μm, a cured product reduced in the transparency or a coating film having a bad surface state tends to result. Furthermore, in order to improve the dispersibility of particles, various surfactants or amines may also be added.

Examples of the commercial product available on the market as a silicon oxide particle (e.g., silica particle) liquid dispersion include, as for the colloidal silica, Methanol Silica Sol, MA-ST-MS, IPA-ST, IPA-ST-MS, IPA-ST-L, IPA-ST-ZL, IPA-ST-UP, EG-ST, NPC-ST-30, MEK-ST, MEK-ST-L, MIBK-ST, NBA-ST, XBA-ST, DMAC-ST, ST-UP, ST-OUP, ST-20, ST-40, ST-C, ST-N, ST-O, ST-50 and ST-OL produced by Nissan Chemical Industries, Ltd.; and, as for the hollow silica, CS60-IPA produced by Catalysts & Chemicals Industries Co., Ltd. Examples of the commercial product available as a powder silica include Aerosil 130, Aerosil 300, Aerosil 380, Aerosil TT600 and Aerosil OX50 produced by Nippon Aerosil Co., Ltd.; Sildex H31, H32, H51, H52, H121 and H122 produced by Asahi Glass Co., Ltd.; E220A and E220 produced by Nippon Silica Kogyo K.K.; SYLYSIA 470 produced by Fuji Silysia Chemical Ltd.; and SG Flake produced by Nippon Sheet Glass Co., Ltd.

Other examples include, as a water dispersion of alumina, Alumina Sol-100, Alumina Sol-200 and Alumina Sol-520 produced by Nissan Chemical Industries, Ltd.; as an isopropanol dispersion of alumina, AS-150I produced by Sumitomo Osaka Cement Co., Ltd.; as a toluene dispersion of alumina, AS-150T produced by Sumitomo Osaka Cement Co., Ltd.; as a toluene dispersion of zirconia, HXU-110JC produced by Sumitomo Osaka Cement Co., Ltd.; as a water dispersion of zinc antimonate powder, Celnax produced by Nissan Chemical Industries, Ltd.; as a powder and a solvent dispersion of alumina, titanium oxide, tin oxide, indium oxide, zinc oxide and the like, NanoTek produced by C.I. Kasei Co., Ltd.; as a water dispersion sol of antimony-doped tin oxide, SN-100D produced by Ishihara Sangyo Kaisha, Ltd.; as an ITO powder, products of Mitsubishi Materials Corp.; and as a water dispersion of cerium oxide, Needral produced by Taki Chemical Co., Ltd.

The shape of the oxide particle is spherical, hollow, porous, rod-like, plate-like, fibrous or amorphous, preferably spherical or hollow. The hollow silica particle is described later. The specific surface area of the oxide particle (as measured by the BET specific surface area measuring method using nitrogen) is preferably from 10 to 1,000 $m^2/g$, more preferably from 100 to 500 $m^2/g$. These inorganic oxide particles may be used by dispersing their powder in the dry state in an organic solvent but, for example, a liquid dispersion of fine particulate oxide particles, which is known in the art as a solvent dispersion sol of the above-described oxide, can be used directly.

In the present invention, one preferred embodiment of using the particles by segregating them to the lower part is an embodiment that a coating solution containing a binder having a low refractive index and fine particles having a high refractive index is coated and the particles having the high refractive index is caused to segregate to the lower part, whereby two layers of high refractive index particle layer/low refractive index layer are formed by one coating operation. Furthermore, by using an electrically conducting particles out of high refractive index particles, an optical film assured of low reflectance and antistatic property can be produced.

As for the high refractive index particles which can be suitably used in the present invention, particles having a refractive index of 1.60 to 2.70 are preferred, and examples thereof include titanium oxide (from 2.2 to 2.7) and zirconium oxide (2.1). Also, examples of the high refractive index particles having electrical conductivity include ITO (refractive index: 1.95), ATO (refractive index: 1.90), antimony pentoxide (1.71) and ZnO (1.90).

The refractive index of the high refractive index particle layer resulting from segregation to the lower part is preferably higher in view of the reduction in the reflectance, but interference unevenness is more readily caused due to uneven thickness of the lower segregation layer.

In particular, when an antistatic optical film is produced by using electrically conducting particles and the main purpose is to impart an antistatic property, one means for preventing interference unevenness is a method of bringing the refractive index of the lower segregation electrically conducting particle layer close to the refractive index of the layer directly underlying it.

In order to control the refractive index of the lower segregation electrically conducting particle-containing layer, low refractive index fine particles having a refractive index of 1.15 to less than 1.60 are preferably mixed. Examples of the low refractive index fine particles include $SiO_2$ and $MgF_2$. In particular, hollow or porous $SiO_2$ is preferred.

The mixing ratio between the electrically conducting particles and the low refractive index layer is not particularly limited as long as the lower segregation layer has electrical conductivity and the refractive index thereof can be controlled to the desired value, but the mixing ratio is preferably from 30/70 to 90/10 (parts by mass), more preferably from 40/60 to 80/20 (parts by mass), and most preferably from 50/50 to 75/25 (parts by mass).

(Dispersion Method)

In the present invention, for preparing the inorganic oxide fine particles by dispersing their powder form in a solvent, a dispersant may be used. Use of a dispersant having an anionic group is preferred in the present invention.

As for the anionic group, a group having an acidic proton, such as carboxyl group, sulfonic acid group (sulfo), phosphoric acid group (phosphonic acid group) and sulfonamide group, or a salt thereof is effective. In particular, a carboxyl group, a sulfonic acid group, a phosphonic acid group, and a salt thereof are preferred, and a carboxyl group and a phosphoric acid group are more preferred. For the purpose of more improving the dispersibility, a plurality of anionic groups may be contained. The average number of anionic groups is preferably 2 or more, more preferably 5 or more, still more preferably 10 or more. Also, in the dispersant, plural kinds of anionic groups may be contained within one molecule.

The dispersant may further contain a crosslinking or polymerizable functional group. Examples of the crosslinking or polymerizable functional group include an ethylenically unsaturated group (e.g., (meth)acryloyl, allyl, styryl, vinyloxy) capable of undergoing addition reaction/polymerization reaction by the effect of a radical species; a cationic polymerizable group (e.g., epoxy, oxatanyl, vinyloxy); and a polycondensation reactive group (e.g., hydrolyzable silyl, N-methylol). Among these, a functional group having an ethylenically unsaturated group is preferred.

In the present invention, a disperser may be used for pulverizing the inorganic oxide particle. Examples of the disperser include a sand grinder mill (e.g., bead mill with pin), a high-speed impeller, a pebble mill, a roller mill, an attritor and a colloid mill. Among these, a sand grinder mill and a high-speed impeller are preferred. Also, a preliminary dispersion treatment may be performed. Examples of the disperser for use in the preliminary dispersion treatment include a ball mill, a three-roll mill, a kneader and an extruder.

(Solvent of Coating Solution)

An organic solvent liquid dispersion of the above-described inorganic oxide fine particles according to the present invention is used as the fine particle component and combined with a binder to prepare a coating composition, and each layer of the optical film can be formed from this composition. The solvent of the coating composition is not limited, but at least two kinds of volatile solvents are preferably used. For example, at least two members selected from alcohols and derivatives thereof, ethers, ketones, hydrocarbons and esters are preferably used in combination. The solvents can be selected in view of the solubility of the binder component, stability of the inorganic fine particle, control of the viscosity of the coating solution, and the like. By using two or more kinds of solvents in combination, fine particles can be controlledly arranged in the film to give the SP value or SA value specified in the present invention. The boiling point of the solvent for use in the present invention is preferably from 50 to 250° C., more preferably from 65 to 200° C. The dielectric constant at 20° C. is preferably from 1 to 50, more preferably from 5 to 30. When a solvent having a dielectric constant of 10 or more is contained in an amount of 10 mass % based on the inorganic fine particle, this is preferred in view of the dispersion stability.

Examples of the solvent which can be used in the present invention include, but are not limited to, the followings:

alcohols and derivatives thereof (e.g., methanol, ethanol, n-propanol, isopropyl alcohol, n-butanol, isobutanol, secondary butanol, tertiary butanol, n-amyl alcohol, isoamyl alcohol, secondary amyl alcohol, 3-pentanol, tertiary amyl alcohol, n-hexanol, methyl amyl alcohol, 2-ethyl butanol, n-heptanol, 2-heptanol, 3-heptanol, n-octanol, 2-octanol, 2-ethyl hexanol, 3,5,5-trimethyl hexanol, nonanol, benzyl alcohol, ethylene glycol, ethylene glycol monomethyl ether, ethylene glycol monomethyl ether acetate, ethylene glycol monoethyl ether, ethylene glycol diethyl ether, ethylene glycol monoethyl ether acetate, ethylene glycol isopropyl ether, ethylene glycol monobutyl ether, ethylene glycol dibutyl ether, ethylene glycol monobutyl ether acetate, ethylene glycol isoamyl ether, methoxy-methoxyethanol, methoxypropanol, butoxyethanol, ethylene glycol monoacetate, ethylene glycol diacetate, diethylene glycol, diethylene glycol monomethyl ether, diethylene glycol monoethyl ether, diethylene glycol diethyl ether, propylene glycol, propylene glycol monomethyl ether, propylene glycol monoethyl ether, propylene glycol monobutyl ether, dipropylene glycol monomethyl ether, dipropylene glycol monomethyl ether, dipropylene glycol monoethyl ether);

ethers (e.g., isopropyl ether, n-butyl ether, diisoamyl ether, methyl phenyl ether, ethyl phenyl ether);

ketones (e.g., acetone, methyl acetone, methyl ethyl ketone, methyl-n-propyl ketone, methyl-n-butyl, methyl isobutyl ketone, methyl-n-amyl ketone, methyl-n-hexyl ketone, diethyl ketone, ethyl-n-butyl ketone, di-n-propyl ketone, diisobutyl ketone, acetonylacetone, diacetone alcohol, cyclohexanone, methylcyclohexanone);

hydrocarbons (e.g., n-hexane, isohexane, n-heptane, n-octane, isooctane, n-decane, toluene, xylene, ethylbenzene, diethylbenzene, isopropylbenzene, amylbenzene); and esters (e.g., propyl formate, n-butyl formate, isobutyl formate, amyl formate, ethyl acetate, n-propyl acetate, isopropyl acetate, n-butyl acetate, isobutyl acetate, secondary butyl acetate, n-amyl acetate, isoamyl acetate, methylisoamyl acetate, methoxybutyl acetate, secondary hexyl acetate, 2-ethylbutyl acetate, 2-ethylhexyl acetate, cyclohexyl acetate, methylcyclohexyl acetate, benzyl acetate, methyl propionate, ethyl propionate, n-butyl propionate, isoamyl propionate, methyl butyrate, ethyl butyrate, n-butyl butyrate, isoamyl butyrate, ethyl oxyisobutyrate, methyl acetoacetate, ethyl acetoacetate, isoamyl isovalerate, methyl lactate, ethyl lactate, n-butyl lactate, isobutyl lactate, n-amyl lactate, isoamyl lactate, methyl benzoate, diethyl oxalate).

A combination of at least two species selected from alcohols and derivatives thereof, ketones and esters is preferred, and a combination of three species selected therefrom is more preferred. For example, two or three species selected from methyl ethyl ketone, methyl isobutyl ketone, cyclohexanone, 2-methoxypropanol, 2-butoxyethanol, isopropyl alcohol and toluene may be preferably used in combination.

In the present invention, in order to controlledly arrange the inorganic fine particles in the layer, the binder is preferably composed of at least one polymerizable composition having a weight average molecular weight of 5,000 or more and at least one polymerizable compound having a weight average molecular weight of less than 5,000. As for specific examples of the composition having a weight average molecular weight of 5,000 or more, a copolymer having a (meth)acryloyl group in the side chain and a high molecular weight compound containing fluorocarbon or dimethylsiloxane are preferred. As for the compound having a weight average molecular weight of less than 5,000, a polyfunctional acrylate monomer and a partial condensate of the compound represented by formula (II) having a (meth)acryloyl group are preferred. These compounds are specifically described in the paragraphs of film-forming binder and low refractive index material.

(Layer Construction of Optical Film)

The optical film of the present invention has, if desired, a hardcoat layer described later on a transparent substrate and has layers stacked thereon by taking into account the refractive index, film thickness, number of layers, order of layers, and the like so as to reduce the reflectance by the effect of optical interference. In a simplest layer construction of the low reflection laminate, only a low refractive index layer is provided by coating on a substrate. In order to more reduce the reflectance, the antireflection layer is preferably constituted by combining a high refractive index layer having a refractive index higher than that of the substrate and a low refractive index layer having a refractive index lower than that of the substrate. Examples of the construction include a two-layer construction of high refractive index layer/low refractive index layer from the substrate side, and a construction formed by stacking three layers differing in the refractive index in the order of middle refractive index layer (layer having a refractive index higher than that of the substrate or hardcoat layer but lower than that of the high refractive index layer)/high refractive index layer/low refractive index layer. Also, a layer construction where a larger number of antireflection layers are stacked has been proposed. In view of the durability, optical property, cost, productivity and the like, it is preferred to coat a middle refractive index layer/a high refractive index layer/a low refractive index layer in this order on a substrate having thereon a hardcoat layer.

Preferred layer construction examples of the low reflection laminate of the present invention include the followings. In the constructions below, the substrate film indicates a support composed of a film.

Substrate film/low refractive index layer
Substrate film/antistatic layer/low refractive index layer
Substrate film/antiglare layer/low refractive index layer Substrate film/antiglare layer/antistatic layer/low refractive index layer Substrate film/antistatic layer/antiglare layer/low refractive index layer Substrate film/hardcoat layer/antiglare layer/low refractive index layer Substrate film/hardcoat layer/antiglare layer/antistatic layer/low refractive index layer Substrate film/hardcoat layer/antistatic layer/antiglare layer/low refractive index layer Substrate film/hardcoat layer/high refractive index layer/low refractive index layer Substrate film/hardcoat layer/antistatic layer/high refractive index layer/low refractive index layer Substrate film/hardcoat layer/medium refractive index layer/high refractive index layer/low refractive index layer Substrate film/antiglare layer/high refractive index layer/low refractive index layer Substrate film/antiglare layer/medium refractive index layer/high refractive index layer/low refractive index layer Substrate film/antistatic layer/hardcoat layer/medium refractive index layer/high refractive index layer/low refractive index layer Antistatic layer/substrate film/hardcoat layer/medium refractive index layer/high refractive index layer/low refractive index layer Substrate film/antistatic layer/antiglare layer/medium refractive index layer/high refractive index layer/low refractive index layer Antistatic layer/substrate film/antiglare layer/medium refractive index layer/high refractive index layer/low refractive index layer Antistatic layer/substrate film/antiglare layer/high refractive index layer/low refractive index layer/high refractive index layer/low refractive index layer.

Insofar as the reflectance can be reduced by the optical interference, the layer construction is not particularly limited only to these layer constructions. The high refractive index layer may be a light-diffusing layer not having an antiglare property.

The antistatic layer is preferably a layer containing an electrically conducting polymer particle or a metal oxide fine particle (e.g., ATO, ITO) and can be provided by coating, atmospheric plasma treatment or the like.

(Film-forming Binder)

In view of the film strength, stability of coating solution, productivity of coating film, and the like, a compound having an ethylenically unsaturated group is preferably used as the main film-forming binder component of the film-forming composition for use in the present invention. The main film-forming binder means a component occupying 10 mass % or more, preferably from 20 to 100 mass %, more preferably from 30 to 95 mass %, in the film-forming components excluding an inorganic particles.

The main film-forming binder is preferably a polymer having a saturated hydrocarbon chain or a polyether chain as the main chain, more preferably a polymer having a saturated hydrocarbon chain as the main chain. The binder polymer having a saturated hydrocarbon chain as the main chain and having a crosslinked structure is preferably a (co)polymer of a monomer having two or more ethylenically unsaturated groups.

In order to obtain a high refractive index, the monomer structure preferably contains an aromatic ring or at least one atom selected from a halogen atom excluding fluorine, a sulfur atom, a phosphorus atom and a nitrogen atom.

Examples of the monomer having two or more ethylenically unsaturated groups include an ester of a polyhydric alcohol and a (meth)acrylic acid (e.g., ethylene glycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate); a vinylbenzene and a derivative thereof (e.g., 1,4-divinylbenzene, 2-acryloylethyl 4-vinylbenzoate, 1,4-divinylcyclohexanone); a vinylsulfone (e.g., divinylsulfone); an acrylamide (e.g., methylenebisacrylamide); and a methacrylamide. These monomers may be also used in combination of two or more thereof. In the present invention, the term "(meth)acrylate" indicates "acrylate or methacrylate".

Specific examples of the high refractive index monomer include bis(4-methacryloylthiophenyl)sulfide, vinylnaphthalene, vinylphenylsulfide and 4-methacryloxyphenyl-4'-methoxyphenylthioether. These monomers may also be used in combination of two or more thereof.

The polymerization of such a monomer having an ethylenically unsaturated group may be performed by the irradiation with ionizing radiation or under heating in the presence of a photoradical initiator or a thermal radical initiator.

Examples of the photoradical polymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds and aromatic sulfoniums. Examples of the acetophenones include 2,2-diethoxy-acetophenone, p-dimethylacetophenone, 1-hydroxydimethyl phenyl ketone, 1-hydroxycyclohexyl phenyl ketone, 2-methyl-4-methylthio-2-morpholinopropiophenone and 2-benzyl-2-dimethylamino-1-(4-morpholinophenyl)-butanone. Examples of the benzoins include benzoin benzenesulfonic acid ester, benzoin toluenesulfonic acid ester, benzoin methyl ether, benzoin ethyl ether and benzoin isopropyl ether. Examples of the benzophenones include benzophenone, 2,4-dichlorobenzophenone, 4,4-dichlorobenzophenone and p-chlorobenzophenone. Examples of the phosphine oxides include 2,4,6-trimethylbenzoyldiphenylphosphine oxide.

Various examples are also described in *Saishin UV Koka Gijutsu* (*Latest UV Curing Technologies*), page 159, Kazuhiro Takausu (publisher), Technical Information Institute Co., Ltd. (1991) and these are useful in the present invention.

Preferred examples of the commercially available photocleavage type photoradical polymerization initiator include Irgacure (e.g., 651, 184, 907) produced by Ciba Specialty Chemicals.

The photopolymerization initiator is preferably used in an amount of 0.1 to 15 parts by mass, more preferably from 1 to 10 parts by mass, per 100 parts by mass of the polyfunctional monomer.

In addition to the photopolymerization initiator, a photosensitizer may be used. Specific examples of the photosensitizer include n-butylamine, triethylamine, tri-n-butylphosphine, Michler's ketone and thioxanthone.

As for the thermal radical initiator, an organic or inorganic peroxide, an organic azo or diazo compound, or the like may be used.

Specifically, examples of the organic peroxide include benzoyl peroxide, halogen benzoyl peroxide, lauroyl peroxide, acetyl peroxide, dibutyl peroxide, cumene hydroperoxide and butyl hydroperoxide; examples of the inorganic peroxide include hydrogen peroxide, ammonium persulfate and potassium persulfate; examples of the azo compound include 2-azo-bis-isobutyronitrile, 2-azo-bis-propionitrile and 2-azo-bis-cyclohexanedinitrile; and examples of the diazo compound include diazoaminobenzene and p-nitrobenzenediazonium.

In the present invention, a polymer having a polyether as the main chain may also be used, and a ring-opened polymer of a polyfunctional epoxy compound is preferred. The ring-opening polymerization of a polyfunctional epoxy compound may be performed by the irradiation with ionizing radiation or under heating in the presence of a photoacid generator or a thermal acid generator.

A crosslinked structure may be introduced into the binder polymer by using a crosslinking functional group-containing monomer in place of or in addition to the monomer having two or more ethylenically unsaturated groups to introduce a crosslinking functional group into the polymer, and reacting the crosslinking functional group.

Examples of the crosslinking functional group include an isocyanate group, an epoxy group, an aziridine group, an oxazoline group, an aldehyde group, a carbonyl group, a hydrazine group, a carboxyl group, a methylol group and an active methylene group. In addition, a vinylsulfonic acid, an acid anhydride, a cyanoacrylate derivative, a melamine, an etherified methylol, an ester, a urethane and a metal alkoxide (e.g., tetramethoxysilane) may also be utilized as the monomer for introducing a crosslinked structure. A functional group which exhibits a crosslinking property as a result of decomposition reaction, such as block isocyanate group, may also be used. That is, in the present invention, the crosslinking functional group may be a functional group which exhibits reactivity not directly but as a result of decomposition.

The binder polymer having such a crosslinking functional group can form a crosslinked structure by the heating after coating.

(Material for Low Refractive Index Layer)

In the low refractive index layer, a binder for dispersing and fixing the fine particles of the present invention is used. As for the binder, the binders described above for the hardcoat layer may be used, but a binder itself having a low refractive index, such as fluorine-containing polymer and fluorine-containing sol-gel material, is preferably used. The fluorine-containing polymer or fluorine-containing sol-gel material is preferably a material capable of crosslinking by the effect of heat or ionizing radiation and ensuring that the surface of the formed low refractive index layer has a coefficient of dynamic friction of 0.03 to 0.30 and a contact angle with water of 85 to 120°.

The refractive index of the low refractive index layer is preferably from 1.20 to 1.46, more preferably from 1.25 to 1.46, still more preferably from 1.30 to 1.46.

The thickness of the low refractive index layer is preferably from 50 to 200 nm, more preferably from 70 to 100 nm. The haze of the low refractive index layer is preferably 3% or less, more preferably 2% or less, and most preferably 1% or less. The strength of the low refractive index layer is, specifically, preferably H or more, more preferably 2H or more, and most preferably 3H or more, as determined by a pencil hardness test with a load of 500 g.

Furthermore, in order to improve the antifouling performance of the optical film, the contact angle with water on the surface is preferably 90° or more, more preferably 95° or more, still more preferably 100° or more.

The copolymer preferably used for the low refractive index layer of the present invention is described below.

Examples of the fluorine-containing vinyl monomer include fluoroolefins (e.g., fluoroethylene, vinylidene fluoride, tetrafluoroethylene, hexafluoropropylene), partially or completely fluorinated alkyl ester derivatives of (meth) acrylic acid (for example, BISCOTE 6FM (trade name, produced by Osaka Yuki Kagaku) and R-2020 (trade name, produced by Daikin)), and completely or partially fluorinated vinyl ethers. Among these, perfluoroolefins are preferred and in view of the refractive index, solubility, transparency, easy availability and the like, hexafluoropropylene is more preferred. When the compositional ratio of the fluorine-containing vinyl monomer is increased, the refractive index can be lowered, but the film strength decreases. In the present invention, the fluorine-containing vinyl monomer is preferably introduced so that the copolymer can have a fluorine content of 20 to 60 mass %, more preferably from 25 to 55 mass %, still more preferably from 30 to 50 mass %.

The copolymer of the present invention preferably comprises, as an essential constituent component, a repeating unit having a (meth)acryloyl group in the side chain. When the compositional ration of the (meth)acryloyl group-containing repeating unit is increased, the film strength may be enhanced, but the refractive index also becomes high. In general, the (meth)acryloyl group-containing repeating unit preferably occupies from 5 to 90 mass %, more preferably from 30 to 70 mass %, still more preferably from 40 to 60 mass %, though this may vary depending on the kind of the repeating unit derived from the fluorine-containing vinyl monomer.

The constituent unit for imparting a crosslinking reactivity mainly includes the following units (A), (B) and (C):

(A) a constituent unit obtained by polymerizing a monomer previously having a self-crosslinking functional group within the molecule, such as glycidyl (meth)acrylate and glycidyl vinyl ether, (B) a constituent unit obtained by polymerizing a monomer having a carboxyl group, a hydroxyl group, an amino group, a sulfo group or the like (for example, a (meth)acrylic acid, a methylol (meth)acrylate, a hydroxyalkyl (meth)acrylate, an allyl acrylate, a hydroxyethyl vinyl ether, a hydroxybutyl vinyl ether, a maleic acid and a crotonic acid), and (C) a constituent unit obtained by reacting the constituent unit of (A) or (B) above with a compound having a group capable of reacting with the functional group of (A) or (B) above and another crosslinking functional group within the molecule (for example, a constituent unit synthesized by a method of causing an acrylic acid chloride to act on a hydroxyl group).

In the present invention, the crosslinking functional group of the constituent unit (C) is preferably a photopolymerizable group. Examples of the photopolymerizable group include a (meth)acryloyl group, an alkenyl group, a cinnamoyl group, a cinnamylideneacetyl group, a benzalacetophenone group, a styrylpyridine group, an α-phenylmaleimide group, a phenylazide group, a sulfonylazide group, a carbonylazide group, a diazo group, an o-quinonediazide group, a furylacryloyl group, a coumarin group, a pyrone group, an anthracene group, a benzophenone group, a stilbene group, a dithiocarbamate group, a xanthate group, a 1,2,3-thiadiazole group, a cyclopropene group and an azadioxabicyclo group. One of these groups or two or more species thereof may be contained. Among these, a (meth)acryloyl group and a cinnamoyl group are preferred, and a (meth)acryloyl group is more preferred.

Specific examples of the method for preparing the photopolymerizable group-containing copolymer include, but are not limited to, the following methods:

(1) a method of esterifying a crosslinking functional group-containing copolymer having a hydroxyl group by a reaction with a (meth)acrylic acid chloride;

(2) a method of urethanizing a crosslinking functional group-containing copolymer having a hydroxyl group by a reaction with a (meth)acrylic acid ester containing an isocyanate group;

(3) a method of esterifying a crosslinking functional group-containing copolymer having an epoxy group by a reaction with a (meth)acrylic acid; and (4) a method of esterifying a crosslinking functional group-containing copolymer having a carboxyl group by a reaction with a (meth)acrylic acid ester containing an epoxy group.

Incidentally, the amount of the photopolymerizable group introduced may be arbitrarily controlled and, for example, in view of the stability of the coated surface state, reduction in the surface failure at the coexistence of an inorganic fine particle, or enhancement of the film strength, it is also preferred to cause a carboxyl group, a hydroxyl group or the like to remain in a given amount.

In the copolymer useful for the present invention, other than the repeating unit derived from the fluorine-containing vinyl monomer and the repeating unit having a (meth)acryloyl group in the side chain, another vinyl monomer may be appropriately copolymerized from various viewpoints such as adhesion to substrate, Tg (contributing to the film hardness) of polymer, solubility in solvent, transparency, slipperiness and dust-protecting•antifouling property. A plurality of these vinyl monomers may be used in combination according to the purpose, and such a vinyl monomer is preferably introduced to occupy in total from 0 to 65 mol %, more preferably from 0 to 40 mol %, still more preferably from 0 to 30 mol %, in the copolymer.

The vinyl monomer unit which can be used in combination is not particularly limited, and examples thereof include olefins (e.g., ethylene, propylene, isoprene, vinyl chloride, vinylidene chloride), acrylic acid esters (e.g., methyl acrylate, methyl acrylate, ethyl acrylate, 2-ethylhexyl acrylate, 2-hydroxyethyl acrylate), methacrylic acid esters (e.g., methyl methacrylate, ethyl methacrylate, butyl methacrylate, 2-hydroxyethyl methacrylate), styrene derivatives (e.g., styrene, p-hydroxymethylstyrene, p-methoxystyrene), vinyl ethers (e.g., methyl vinyl ether, ethyl vinyl ether, cyclohexyl vinyl ether, hydroxyethyl vinyl ether, hydroxybutyl vinyl ether), vinyl esters (e.g., vinyl acetate, vinyl propionate, vinyl cinnamate), unsaturated carboxylic acids (e.g., acrylic acid, methacrylic acid, crotonic acid, maleic acid, itaconic acid), acrylamides (e.g., N,N-dimethylacrylamide, N-tert-butylacrylamide, N-cyclohexylacrylamide), methacrylamides (e.g., N,N-dimethylmethacrylamide) and acrylonitrile.

The fluorine-containing polymer particularly useful in the present invention is a random copolymer of a perfluoroolefin and vinyl ethers or vinyl esters. The copolymer preferably contains a group capable of undergoing a crosslinking reaction by itself (for example, a radical reactive group such as (meth)acryloyl group, and ring-opening polymerizable group such as epoxy group and oxetanyl group). Such a crosslinking reactive group-containing polymerization unit preferably occupies from 5 to 70 mol %, more preferably from 30 to 60 mol %, in all polymerization units of the polymer. Preferred examples of the polymer include those described in JP-A-2002-243907, JP-A-2002-372601, JP-A-2003-26732, JP-A-2003-222702, JP-A-2003-294911, JP-A-2003-329804, JP-A-2004-4444 and JP-A-2004-45462.

In the fluorine-containing polymer for use in the present invention, a polysiloxane structure is preferably incorporated for the purpose of imparting antifouling property. The method for incorporating a polysiloxane structure is not limited, but preferred examples thereof include a method of introducing a polysiloxane block copolymerization component by using a silicone macroazo initiator described in JP-A-6-93100, JP-A-11-189621, JP-A-11-228631 and JP-A-2000-313709, and a method of introducing a polysiloxane graft copolymerization component by using a silicone macromer described in JP-A-2-251555 and JP-A-2-308806. Particularly preferred compounds include the polymers in Examples 1, 2 and 3 of JP-A-11-189621, and Copolymers A-2 and A-3 of JP-A-2-251555. The content of the polysiloxane component in the polymer is preferably from 0.5 to 10 mass %, more preferably from 1 to 5 mass %.

As for the preferred molecular weight of the polymer which can be preferably used in the present invention, the mass average molecular weight is 5,000 or more, preferably from 10,000 to 500,000, and most preferably from 15,000 to 200,000. It is also possible to improve the coating film surface state or scratch resistance by using polymers differing in the average molecular weight in combination.

A curing agent having a polymerizable unsaturated group described in JP-A-10-25388 and JP-A-2000-17028 may be appropriately used in combination with the above-described polymer. Also, as described in JP-A-2002-145952, use in combination with a compound having a fluorine-containing polyfunctional polymerizable unsaturated group is preferred. Example of the compound having a polyfunctional polymerizable unsaturated group include the polyfunctional monomers described above for the hardcoat layer. Such a compound is preferred because a large effect on the improvement of scratch resistance is provided by its use in combination particularly when a compound having a polymerizable unsaturated group is used for the polymer main body.

In the case of a polymer not having sufficient curability by itself, necessary curability can be imparted by blending a crosslinking compound. For example, when the polymer main body contains a hydroxyl group, various amino compounds are preferably used as the curing agent. The amino compound used as the crosslinking compound is, for example, a compound having two or more in total either one or both of a hydroxyalkylamino group and an alkoxyalkylamino group, and specific examples thereof include a melamine-based compound, a urea-based compound, a benzoguanamine-based compound and a glycoluril-based compound.

The melamine-based compound is generally known as a compound having a skeleton where a nitrogen atom is bonded to a triazine ring, and specific examples thereof include melamine, an alkylated melamine, a methylol melamine and an alkoxylated methylmelamine. Those having two or more in total either one or both of a methylol group and an alkoxylated methyl group within one molecule are preferred. Specifically, a methylolated melamine obtained by reacting a melamine with a formaldehyde under the basic condition, an alkoxylated methylmelamine, and a derivative thereof are preferred, and an alkoxylated methylmelamine is more preferred because the curable resin composition can have good storage stability and good reactivity. The methylolated melamine and alkoxylated methylmelamine used as the crosslinking compound are not particularly limited, and various resinous materials obtained by the method described, for example, in Plastic Zairyo Koza [8] Urea Melamine Jushi (Plastic Material Course [8] Urea Melamine Resin), Nikkan Kogyo Shinbun Sha may also be used.

Examples of the urea-based compound include urea, a polymethylolated urea, an alkoxylated methyl urea which is a derivative of the polymethylolated urea, a methylolated uron having a uron ring, and an alkoxylated methyluron. Also for the compound such as urea derivative, various resinous materials described in the reference above can be used.

In the low refractive index layer for use in the present invention, a compound capable of generating a radical or an acid upon irradiation with ionizing radiation or heat may be used.

As for the photoradical initiator and thermal radical initiator, the compounds described above for the film-forming binder can be used.

(Thermal Acid Generator)

Specific examples of the thermal acid generator include various aliphatic sulfonic acids and salts thereof, various aliphatic carboxylic acids (e.g., citric acid, acetic acid, maleic acid) and salts thereof, various aromatic carboxylic acids (e.g., benzoic acid, phthalic acid) and salts thereof, an alkylbenzenesulfonic acid and an ammonium salt thereof, various metal salts, a phosphoric acid, and a phosphoric acid ester of an organic acid. The ratio of the thermal acid generator used is preferably from 0.01 to 10 parts by mass, more preferably from 0.1 to 5 parts by mass, per 100 parts by mass of the curable resin composition. When the amount added is in this range, good storage stability of the curable resin composition and good scratch resistance of the coating film are ensured.

(Photosensitive Acid Generator)

Examples of the photosensitive acid generator include (1) various onium salts such as iodonium salt, sulfonium salt, phosphonium salt, diazonium salt, ammonium salt and pyridinium salt; (2) sulfonated compounds such as β-ketoester, β-sulfonylsulfone and their α-diazo compound; (3) sulfonic acid esters such as alkylsulfonic acid ester, haloalkylsulfonic acid ester, arylsulfonic acid ester and iminosulfonate; (4) sulfonimide compounds; and (5) diazomethane compounds. The ratio of the photosensitive acid generator used is preferably from 0.01 to 10 parts by mass, more preferably from 0.1 to 5 parts by mass, per 100 parts by mass of the curable resin composition.

The inorganic particles which can be preferably used in the low refractive index layer of the antireflection film of the present invention is described below.

The coated amount of the inorganic fine particles is preferably from 1 to 100 mg/m$^2$, more preferably from 5 to 80 mg/m$^2$, still more preferably from 10 to 60 mg/m$^2$. If the coated amount is too small, the effect of improving the scratch resistance decreases, whereas if it is excessively large, fine irregularities are generated on the low refractive index layer surface and the appearance (e.g., real black) or integrated reflectance may be deteriorated. The inorganic fine particle is incorporated into the low refractive index layer and therefore, preferably has a low refractive index.

Specifically, the organic fine particles are inorganic oxide particles or hollow inorganic oxide particles dispersed in the organic solvent liquid dispersion described above and subjected to a dispersibility improving treatment, and those having a low refractive index are preferably used. Examples thereof include a silica fine particle and a hollow silica fine particle.

The average particle diameter of the silica fine particles is preferably from 30 to 150%, more preferably from 35 to 80%, still more preferably from 40 to 60%, of the thickness of the low refractive index layer. In other words, when the thickness of the low refractive index layer is 100 nm, the particle diameter of the silica fine particles is preferably from 30 to 150 nm, more preferably from 35 to 80 nm, still more preferably from 40 to 60 nm.

If the particle diameter of the silica fine particles is too small, the effect of improving the scratch resistance decreases, whereas if it is excessively large, fine irregularities are generated on the low refractive index layer surface and the appearance (e.g., real black) or integrated reflectance may be deteriorated. The silica fine particles may be either crystalline or amorphous and may be monodisperse particles or if the predetermined particle diameter is satisfied, may be aggregate particles. The shape is most preferably spherical but even if amorphous, there arises no problem. Here, the average particle diameter of the inorganic fine particle is measured by a Coulter counter.

In order to reduce the refractive index of the low refractive index layer, hollow silica fine particles are preferably used. The refractive index of the hollow silica fine particles is preferably from 1.17 to 1.40, more preferably from 1.17 to 1.35, still more preferably from 1.17 to 1.30. The refractive index as used herein indicates a refractive index of the particle as a whole and does not indicate a refractive index of only the outer shell silica forming the hollow silica fine particle. At this time, assuming that the radius of the cavity inside the particle is a and the radius of the outer shell of the particles is b, the porosity x is calculated according to the following mathematical formula (VIII):

$$x=(4\pi a^3/3)/(4\pi b^3/3)\times 100 \qquad \text{Mathematical Formula (VIII)}$$

The porosity x is preferably from 10 to 60%, more preferably from 20 to 60%, and most preferably from 30 to 60%. If the hollow silica particle is made to have a lower refractive index and a higher porosity, the thickness of the outer shell becomes small and the strength as a particle decreases. Therefore, in view of the scratch resistance, a particle having a low refractive index of less than 1.17 is not usable.

Incidentally, the refractive index of the hollow silica particle was measured by an Abbe refractometer (manufactured by ATAGO K.K.).

Also, the refractive index of the low refractive index layer can be reduced by incorporating hollow particles into the layer. In the case of using hollow particles, the refractive index of the layer is preferably from 1.20 to 1.46, more preferably 1.25 to 1.41, and most preferably from 1.30 to 1.39.

Furthermore, at least one kind of silica fine particles having an average particle diameter of less than 25% of the thickness of the low refractive index layer (this particle is referred to as a "small-particle-size silica fine particles") is preferably used in combination with silica fine particles having the above-described particle diameter (this particle is referred to as a "large-particle-size silica fine particles").

The small-particle-size silica fine particle can be present in a gap between large-particle-size silica fine particles and therefore, can contribute as a holding agent for the large-particle-size silica fine particles.

The average particle diameter of the small-particle-size silica fine particles is preferably, when the thickness of the low refractive index layer is 100 nm, from 1 to 20 nm, more preferably from 5 to 15 nm, still more preferably from 10 to 15 nm. Use of such a silica fine particle is preferred in view of the raw material cost and the holding agent effect.

In the present invention, from the standpoint of enhancing the film strength, a hydrolysate of organosilane and/or a partial condensate thereof is preferably added. For the synthesis of a partial condensate (simply referred to as a "sol") of an organosilane compound, the acid catalyst or metal chelate compound used for the dispersibility improving treatment of the inorganic oxide fine particle for use in the present invention may be used. The amount of the sol added is preferably from 2 to 200 mass %, more preferably from 5 to 100 mass %, and most preferably from 10 to 50 mass %, based on the inorganic oxide particle.

In the present invention, from the standpoint of enhancing the antifouling property, the surface free energy on the antireflection film surface is preferably reduced. Specifically, a fluorine-containing compound or a compound having a polysiloxane structure is preferably used in the low refractive index layer. As for the additive having a polysiloxane structure, addition of a reactive group-containing polysiloxane (for example, KF-100T, X-22-169AS, KF-102, X-22-3701IE, X-22-164B, X-22-5002, X-22-173B, X-22-174D, X-22-167B, X-22-161AS (all trade names, produced by Shin-Etsu Chemical Co., Ltd.), AK-5, AK-30, AK-32 (all trade names, produced by Toagosei Chemical Industry Co., Ltd.), SILAPLANE FM0725, SILAPLANE FM0721 (both trade names, produced by Chisso Corp.)) is also preferred. Furthermore, the silicone-based compounds described in Tables 2 and 3 of JP-A-2003-112383 may also be preferably used. Such a polysiloxane is preferably added in an amount of 0.1 to 10 mass %, more preferably from 1 to 5 mass %, based on the entire solid content of the low refractive index layer.

(Material for High Refractive Index Layer)

In the present invention, a high refractive index layer is preferably provided. The high refractive index layer may be formed from a binder, matting particles for imparting an antiglare property, and an inorganic filler for elevating the refractive index, preventing the crosslinking shrinkage and increasing the strength.

For the purpose of imparting an antiglare property, the high refractive index layer may contain matting particles larger than the filler particles and having an average particle diameter of 0.1 to 5.0 µm, preferably from 1.5 to 3.5 µm, such as inorganic compound particles or resin particles. If the difference in the refractive index between the matting particles and the binder is excessively large, the film becomes white turbid, whereas if it is too small, a sufficiently high light diffusing effect cannot be obtained. Accordingly, the difference in the refractive index therebetween is preferably from 0.02 to 0.20, more preferably from 0.04 to 0.10. Similarly to the refractive index, if the amount added of the matting particles based on the binder is excessively large, the film becomes white turbid, whereas if it is too small, a sufficiently high light diffusing effect cannot be obtained. Accordingly, the amount added is preferably from 3 to 30 mass %, more preferably from 5 to 20 mass %, based on the binder.

Specific preferred examples of the matting particles include inorganic compound particles such as silica particles and $TiO_2$ particles; and resin particles such as acryl particles, crosslinked acryl particles, polystyrene particles, crosslinked styrene particles, melamine resin particles and benzoguanamine resin particles. Among these, crosslinked styrene particles, crosslinked acryl particles and silica particles are more preferred.

The shape of the matting particles may be either true spherical or amorphous.

Two or more different kinds of matting particles may be used in combination. In the case of using two or more kinds of matting particles, in order to effectively bring out the refractive index control by the mixing of those matting particles, the difference in the refractive index therebetween is preferably from 0.02 to 0.10, more preferably from 0.03 to 0.07. The matting particles having a larger particle diameter can impart an antiglare property, and the matting particles having a smaller particle diameter can impart a different optical property. For example, when the antireflection film is stacked on a high-definition display of 133 ppi or more, it is required to cause no trouble called glare in the optical performance. The glare is attributable to a phenomenon that the picture element is enlarged or reduced due to irregularities (contributing to the antiglare property) present on the film surface and the uniformity of brightness is lost. The glare can be greatly improved by using in combination a matting particle having a particle diameter smaller than that of the matting particle for imparting the antiglare property and having a refractive index different from that of the binder.

The particle diameter distribution of the matting particles is most preferably monodisperse. Individual particles preferably have the same particle diameter as much as possible. For example, when particles having a particle diameter 20% or more larger than the average particle diameter are defined as coarse particles, the percentage of the coarse particles occupying in the total number of particles is preferably 1% or less, more preferably 0.1% or less, still more preferably 0.01% or less. The matting particles having such a particle diameter distribution is obtained by performing classification after the normal synthesis reaction. By increasing the number of classifications or intensifying the classification degree, a matting agent having a more preferred distribution can be obtained.

The matting particles are incorporated into the hardcoat layer so that the formed hardcoat layer can have a matting particle content of preferably from 10 to 1,000 $mg/m^2$, more preferably from 100 to 700 $mg/m^2$.

The particle size distribution of the matting particle is measured by the Coulter counter method, and the measured distribution is converted into the particle number distribution.

In addition to the above-described matting particles, for elevating the refractive index of the hardcoat layer and reducing the curing shrinkage, the layer preferably contains an inorganic filler comprising an oxide of at least one metal selected from the group consisting of titanium, zirconium, aluminum, indium, zinc, tin and antimony and having an average particle diameter of 0.2 µm or less, preferably 0.1 µm or less, more preferably 0.06 µm or less.

Furthermore, for increasing the difference in the refractive index from the matting particles, it is also preferred to use an oxide of silicon in the hardcoat layer using high refractive index matting particles and thereby keep lower the refractive index of the layer. The preferred particle diameter is the same as that of the above-described inorganic filler.

Specific examples of the inorganic filler for use in the hardcoat layer include $TiO_2$, $ZrO_2$, $Al_2O_3$, $In_2O_3$, $ZnO$, $SnO_2$, $Sb_2O_3$, ITO and $SiO_2$. Among these, $TiO_2$ and $ZrO_2$ are preferred in view of elevating the refractive index. The surface of the inorganic filler is preferably subjected to a silane coupling treatment or a titanium coupling treatment. A surface treating agent having a functional group capable of reacting with the binder species on the filler surface is preferably used.

The amount of the inorganic filler added is preferably from 10 to 90%, more preferably from 20 to 80%, still more preferably from 30 to 70%, based on the entire mass of the hardcoat layer.

Incidentally, such a filler has a particle diameter sufficiently smaller than the wavelength of light and therefore, causes no scattering, and the dispersion obtained by dispersing the filler in a binder polymer behaves as an optically uniform substance.

The bulk refractive index of the mixture of the binder and the inorganic filler in the hardcoat layer for use in the present invention is preferably 1.48 to 2.00, more preferably from 1.50 to 1.80. The refractive index in this range can be attained by appropriately selecting the kind and amount ratio of the binder and the inorganic filler. How to select these can be easily known in advance by an experiment.

The haze value of the thus-formed optical film of the present invention is from 3 to 70%, preferably from 4 to 60%, and the average reflectance at 450 to 650 nm is 3.0% or less, preferably 2.5% or less.

When the optical film of the present invention has a haze value and an average reflectance within the above-described ranges, good antiglare and antireflection properties can be obtained without incurring deterioration of the transmitted image.

In the antireflection film of the present invention, by forming an antistatic layer, a dust (e.g., grit) can be prevented from attaching to the antireflection film surface, that is, can exert excellent dust resistance. The dust resistance can be brought out by decreasing the surface resistance value on the antireflection film surface, and the electrical conductivity of the antistatic layer is higher, the effect obtained is higher. In the antireflection film of the present invention, the surface resistance value of the surface on the side having an outermost layer is preferably $1 \times 10^{13}$ Ω/square or less, more preferably $1 \times 10^{12}$ Ω/square or less, still more preferably $1 \times 10^{11}$ Ω/square or less, yet still more preferably $1 \times 10^{9}$ Ω/square or less, and particularly preferably $1 \times 10^{8}$ Ω/square or less.

In the antireflection film of the present invention, the antistatic layer may be formed by either a vapor phase method (e.g., vacuum vapor deposition, sputtering, ion plating, plasma CVD) or a coating method, but the coating method is preferred because the antistatic layer can be produced at a low cost.

At least one or more antistatic layer is produced on a transparent support. The antistatic layer may be produced either between the transparent support and the outermost layer or on the side opposite the outermost layer with respect to the transparent support, but is preferably produced between the transparent support and the outermost layer, more preferably at the position closer to the outermost layer between the transparent support and the outermost layer. Particularly preferred constructions are as follows:

substrate film/antistatic layer/low refractive index layer, substrate film/antiglare layer/antistatic layer/low refractive index layer, and substrate film/antistatic layer/antiglare layer/low refractive index layer.

The production of the antistatic layer by the vapor phase method can be performed, for example, by vapor-depositing or sputtering an electrically conducting substance on the film. Specific examples of the usable electrically conducting substance include a metal simple substance such as aluminum, copper, gold, silver, nickel, chromium, iron, molybdenum, titanium, tungsten and tantalum, an alloy thereof, and a metal oxide such as antimony-doped zinc oxide (ATO), tin-doped indium oxide (ITO) and aluminum-doped zinc oxide. In the case of producing the antistatic layer by the vapor phase method, the thickness of the antistatic layer is usually from 5 to 200 nm, preferably from 10 to 150 nm, more preferably from 20 to 120 nm, still more preferably from 30 to 100 nm. For the production of the antistatic layer by the vapor phase method, conventionally known techniques can be used.

In the case of producing the antistatic layer by coating, the antistatic layer is preferably produced by incorporating an electrically conducting material (e.g., electronic conduction-type electrically conducting particles, ion conduction-type organic compound) into a binding agent (e.g., binder). In particular, an electron conduction-type electrically conducting material is preferred, because this material is insusceptible to the environmental change and ensures stable electrically conducting performance, particularly exhibits good electrically conducting performance even in a low-humidity environment.

A preferred method for producing the antistatic layer by coating is described below.

(Electrically Conducting Material)

The electrically conducting material for use in the antistatic layer is preferably an electron conduction-type electrically conducting material such as π-conjugated electrically conducting organic compound and electrically conducting fine particles.

Examples of the π-conjugated electrically conducting organic compound include an aliphatic conjugated system (e.g., polyacetylene), an aromatic conjugated system (e.g., poly(paraphenylene)), a heterocyclic conjugated system (e.g., polypyrrole, polythiophene), a heteroatom-containing conjugated system (e.g., polyaniline), and a mixture-type conjugated system (e.g., poly(phenylene vinylene)).

Examples of the electrically conducting fine particles include carbon-based fine particles, metal-based fine particles, metal oxide-based fine particles and electrically conducting coated fine particles.

Examples of the carbon-based fine particles include carbon powder such as carbon black, ketjen black and acetylene black, a carbon fiber such as PAN-based carbon fiber and pitch-based carbon fiber, and a carbon flake as a ground product of expanded graphite.

Examples of the metal-based fine particles include a powder of a metal (e.g., aluminum, copper, gold, silver, nickel, chromium, iron, molybdenum, titanium, tungsten, tantalum) or an alloy containing such a metal, a metal flake, and a metal fiber of iron, copper, stainless steel, silver-plated copper, brass or the like.

Examples of the metal oxide-based fine particles include tin oxide, antimony-doped tin oxide (ATO), indium oxide, tin-doped indium oxide (ITO), zinc oxide and aluminum-doped zinc oxide.

Preferred examples of the electrically conducting coated fine particles include an electrically conducting fine particles obtained by coating the surface of various fine particles such as titanium oxide (spherical or needle-like), potassium titanate, aluminum borate, barium sulfate, mica and silica, with an electrically conducting material such as tin oxide, ATO and ITO; and a resin bead such as polystyrene, acrylic resin, epoxy resin, polyamide resin, polyurethane resin, melamine resin and formaldehyde resin which are surface-treated with a metal such as gold and/or nickel. These are particles obtained by forming an electrically conducting portion of metal or metal oxide on the outer surface of a non-electrically conducting material and are characterized in that the electrical conductivity is higher on the surface than in the inside of the particles. The material used for the surface treatment is a metal or a metal oxide, preferably a metal. Out of the metals, gold, silver and nickel which are a stable metal having high electrical conductivity, are preferred, and gold is most preferred.

The electrically conducting material for the antistatic layer is preferably a π-conjugated electrically conducting organic compound (particularly, a polythiophene-based electrically conducting polymer) or, as the electrically conducting fine particles, metal-based fine particles (particularly, gold, silver, silver/palladium alloy, copper, nickel or aluminum) or metal oxide-based fine particles (particularly, tin oxide, ATO, ITO, zinc oxide or aluminum-doped zinc oxide). In particular, an electron conduction-type electrically conducting material such as metal and metal oxide is preferred, and a metal oxide-based fine particle is more preferred.

The mass average primary particle diameter of the electrically conducting material is preferably from 1 to 200 nm, more preferably from 1 to 150 nm, still more preferably from 1 to 100 nm, yet still more preferably from 1 to 80 nm. The average particle diameter of the electrically conducting material can be measured by a light scattering method or an electron microphotograph.

The specific surface area of the electrically conducting material is preferably from 10 to 400 $m^2/g$, more preferably from 20 to 200 $m^2/g$, and most preferably from 30 to 150 $m^2/g$.

The shape of the electrically conducting material is preferably a pebble form, a spherical form, a cubic form, a spindle form, a scale form, a needle form or an amorphous form, more preferably an amorphous form, a needle form or a scale form.

(Antistatic Layer Forming Method)

In the case of producing the antistatic layer by the coating method, the electrically conducting material is preferably used in the dispersion state for the formation of the antistatic layer. At the dispersion, the electrically conducting material is preferably dispersed in a dispersion medium in the presence of a dispersant.

By the dispersion with use of a dispersant, the electrically conducting material can be very finely dispersed and a transparent antistatic layer can be produced. Particularly, in the case of using the antistatic layer as an optical interference layer and imparting an antireflection function to the layer, when the electrically conducting material is finely dispersed, this is advantageous in that the transparency of the layer as well as the antireflection performance can be enhanced.

(Dispersant)

At the dispersion of the electrically conducting material for use in the present invention, a dispersant having an anionic group is preferably used. As for the anionic group, a group having an acidic proton, such as carboxyl group, sulfonic acid group (sulfo group), phosphoric acid group (phosphono group) and sulfonamide group, or a salt thereof is effective. In particular, a carboxyl group, a sulfonic acid group, a phosphonic acid group, and a salt thereof are preferred, and a carboxyl group and a phosphoric acid group are more preferred.

The number of anionic groups contained per molecule of the dispersant may be sufficient if it is 1 or more. For the purpose of more improving the dispersibility of the electrically conducting material, a plural number of anionic groups may be contained per molecule of the dispersant. The average number of anionic groups per molecule is preferably 2 or more, more preferably 5 or more, still more preferably 10 or more. Also, plural kinds of anionic groups may be contained in one molecule of the dispersant.

Examples of the dispersant having an anionic polar group include "Phosphanol" (e.g., PE-510, PE-610, LB-400, EC-6103, RE-410; all produced by Toho Chemical Industrial Co., Ltd.), and "Disperbyk" (e.g., -110, -111, -116, -140, -161, -162, -163, -164, -170, -171; all produced by BYK Chemie Japan).

The dispersant preferably further contains a crosslinking or polymerizable functional group. Examples of the crosslinking or polymerizable functional group include an ethylenically unsaturated group {e.g., (meth)acryloyl, allyl, styryl, vinyloxy} capable of undergoing crosslinking reaction/polymerization reaction by the effect of a radical species; a cationic polymerizable group (e.g., epoxy, oxatanyl, vinyloxy); and a polycondensation reactive group (e.g., hydrolyzable silyl, N-methylol). A functional group having an ethylenically unsaturated group is preferred.

In particular, the dispersant used for dispersing the electrically conducting material in the antistatic layer for use in the present invention is preferably a dispersant having an anionic group and a crosslinking or polymerizable functional group and at the same time, having the crosslinking or polymerizable functional group in the side chain.

The mass average molecular weight (Mw) of the dispersant particularly preferred in the present invention is not particularly limited but is preferably 1,000 or more. The mass average molecular weight (Mw) of the dispersant is more preferably from 2,000 to 1,000,000, still more preferably from 5,000 to 200,000, yet still more preferably from 10,000 to 100,000.

The amount of the dispersant used is preferably from 1 to 50 mass %, more preferably from 5 to 30 mass %, and most preferably from 5 to 20 mass %, based on the electrically conducting material. Also, two or more kinds of dispersants may be used in combination.

The electrically conducting material is preferably dispersed in a dispersion medium in the presence of a dispersant.

(Dispersion Medium)

The dispersion medium used is preferably a liquid having a boiling point of 60 to 170° C. Examples of the dispersion medium include water, alcohols (e.g., methanol, ethanol, isopropanol, butanol, benzyl alcohol), ketones (e.g., acetone, methyl ethyl ketone, methyl isobutyl ketone, cyclohexanone), esters (e.g., methyl acetate, ethyl acetate, propyl acetate, butyl acetate, methyl formate, ethyl formate, propyl formate, butyl formate), an aliphatic hydrocarbon (e.g., hexane, cyclohexane), a halogenated hydrocarbon (e.g., methylene chloride, chloroform, carbon tetrachloride), an aromatic hydrocarbon (e.g., benzene, toluene, xylene), an amide (e.g., dimethylformamide, dimethylacetamide, n-methylpyrrolidone), an ether (e.g., diethyl ether, dioxane, tetrahydrofuran) and an ether alcohol (e.g., 1-methoxy-2-propanol). Among these, preferred are toluene, xylene, methyl ethyl ketone, methyl isobutyl ketone, cyclohexanone and butanol.

The dispersion medium is more preferably methyl ethyl ketone, methyl isobutyl ketone or cyclohexanone.

(Dispersion of Electrically Conducting Material)

The electrically conducting material is preferably dispersed by using a disperser. Examples of the disperser include a sand grinder mill (e.g., bead mill with pin), a Dyno-mill, a high-speed impeller, a pebble mill, a roller mill, an attritor and a colloid mill. A media disperser such as sand grinder mill and Dyno-mill is preferred. Also, a preliminary dispersion treatment may be performed. Examples of the disperser for use in the preliminary dispersion treatment include a ball mill, a three-roll mill, a kneader and an extruder.

The electrically conducting material is preferably dispersed in the dispersion medium to have a particle diameter as small as possible. The mass average particle diameter is from 1 to 200 nm, preferably from 5 to 150 nm, more preferably from 10 to 100 nm, still more preferably from 10 to 80 nm. By dispersing the electrically conducting material to have a small particle diameter of 200 nm or less, an antistatic layer not impairing the transparency can be produced.

The antistatic layer for use in the present invention preferably contains an organic compound binder in addition to the electrically conducting material. The electrically conducting material is preferably dispersed after forming the layer matrix by the binder. Accordingly, the antistatic layer is preferably produced by dispersing the electrically conducting material in a dispersion medium, and adding a binder or a binder precursor to the resulting liquid dispersion. As for the binder or binder precursor, for example, a non-curing thermoplastic resin or a curing resin such as thermosetting resin and ionizing radiation-curable resin, may be used.

(Support)

The transparent support used for the optical film of the present invention is preferably a plastic film. Examples of the polymer forming the plastic film include a cellulose ester (e.g., triacetyl cellulose, diacetyl cellulose; representatively, TAC-TD80U and TD80UF produced by Fuji Photo Film Co., Ltd.), a polyamide, a polycarbonate, a polyester (e.g., polyethylene terephthalate, polyethylene naphthalate), a polystyrene, a polyolefin, a norbornene-based resin (ARTON, trade name, produced by JSR) and an amorphous polyolefin (ZEONEX, trade name, produced by Nippon Zeon). Among these, preferred are triacetyl cellulose, polyethylene terephthalate and polyethylene naphthalate, and more preferred is triacetyl cellulose. The cellulose acylate film containing substantially no halogenated hydrocarbon such as dichloromethane and the production method thereof are described in *JIII Journal of Technical Disclosure* (No. 2001-1745, issued on Mar. 15, 2001, hereinafter simply referred to as "Kokai Giho 2001-1745"), and the cellulose acylates described therein may also be preferably used in the present invention.

(Saponification Treatment)

In the case of using the optical film of the present invention for a liquid display, the optical film is disposed on the outermost surface of the display, for example, by providing a pressure-sensitive adhesive layer on one surface. In the case where the transparent support is triacetyl cellulose, triacetyl cellulose is used as the protective film for protecting the polarizing layer of a polarizing plate and therefore, in view of the cost, the optical film of the present invention is preferably used directly as the protective film.

In the case where the optical film of the present invention is disposed on the outermost surface of a display, for example, by providing a pressure-sensitive adhesive layer on one surface or used directly as the protective film of a polarizing plate, in order to ensure satisfactory adhesion, a saponification treatment is preferably performed after an outermost layer mainly comprising a fluorine-containing polymer is formed on a transparent support. The saponification treatment is performed by a known method, for example, by dipping the film in an alkali solution for an appropriate time period. After dipping in an alkali solution, the film is preferably well washed with water or dipped in a dilute acid so as to neutralize the alkali component and prevent the alkali component from remaining in the film.

By performing a saponification treatment, the surface of the transparent support on the side opposite the surface having the outermost layer is hydrophilized.

The hydrophilized surface is effective particularly for improving the adhesive property to a deflecting film mainly comprising a polyvinyl alcohol. Furthermore, the hydrophilized surface hardly allows for attachment of dusts in the air and dusts scarcely intrude into the space between the deflecting film and the optical film at the bonding to the deflecting film, so that point defects due to dusts can be effectively prevented.

The saponification treatment is preferably performed such that the surface of the transparent support on the side opposite the surface having the outermost layer has a contact angle with water of 40° or less, more preferably 30° or less, still more preferably 20° or less.

The means for the alkali saponification treatment can be specifically selected from the following two methods (1) and (2). The method (1) is advantageous in that the treatment can be performed by the same process as that for general-purpose triacetyl cellulose film, but since the antireflection film surface is also saponified, there may arise a problem that the film is deteriorated due to alkali hydrolysis of the surface or the remaining saponification treatment solution causes staining. In such a case, the method (2) is advantageous, though this is a special process.

(1) After the formation of an antireflection layer on a transparent support, the support is dipped at least once in an alkali solution, whereby the back surface of the film is saponified.

(2) Before or after the formation of an antireflection layer on a transparent support, an alkali solution is applied to the surface of the optical film on the side opposite the surface where the optical film is formed, and then the support is heated and washed with water and/or neutralized, whereby only the back surface of the film is saponified.

(Coating Film Forming Method)

The optical film of the present invention can be formed by the following method, but the present invention is not limited to this method.

First, a coating solution containing components for forming each layer is prepared. The coating solution prepared is coated on a transparent support by a dip coating method, an air knife coating method, a curtain coating method, a roller coating method, a wire bar coating method, a gravure coating method or an extrusion coating method (see, U.S. Pat. No. 2,681,294), and then heated and dried. Out of these coating methods, when the coating solution is coated by a gravure coating method, a coating solution in a small coated amount as in each layer of the antireflection film can be coated with high film thickness uniformity and this is preferred. Among the gravure coating methods, a microgravure coating method is more preferred, because the film thickness uniformity is high.

Furthermore, a coating solution in a small coated amount can be coated with high film thickness uniformity also by a die coating method. The die coating method is a pre-measuring system and therefore, is advantageous in that the control of film thickness is relatively easy and the solvent in the coated part is less evaporation-dissipated. Two or more layers may be coated simultaneously. The simultaneous coating method is described in U.S. Pat. Nos. 2,761,791, 2,941,898, 3,508,947 and 3,526,528, and Yuji Harasaki, *Coating Kogaku (Coating Engineering)*, page 253, Asakura-shoten (1973).

(Polarizing Plate)

The polarizing plate mainly comprises a polarizing film and two protective films sandwiching the polarizing film from both sides. The optical film of the present invention is preferably used for at least one protective film out of two protective films sandwiching the polarizing film from both sides. By arranging the optical film of the present invention to serve also as a protective film, the production cost of the polarizing plate can be reduced. Furthermore, by using the optical film of the present invention as an outermost surface layer, a polarizing plate prevented from the projection of outside light or the like and excellent in the scratch resistance, antifouling property and the like can be obtained.

As for the polarizing film, a known polarizing film or a polarizing film cut out from a lengthy polarizing film with the absorption axis of the polarizing film being neither parallel nor perpendicular to the longitudinal direction, may be used. The lengthy polarizing film with the absorption axis of the polarizing film being neither parallel nor perpendicular to the longitudinal direction is produced by the following method.

Namely, this polarizing film is obtained by continuously feeding a polymer film and stretching the film by applying a tension while holding both edges of the film with holding means and can be produced by a stretching method where the film is stretched to 1.1 to 20.0 times at least in the film width direction, the holding devices at both edges of the film are moved to create a difference in the travelling speed of 3% or less in the longitudinal direction, and the travelling direction of the film in the state of being held at both edges is bent such that the angle made by the film travelling direction at the outlet in the step of holding both edges of the film and the substantial stretching direction of the film inclines at 20 to 70°. Particularly, a polarizing film produced with an inclination angle of 45° is preferred in view of productivity.

The stretching method of a polymer film is described in detail in JP-A-2002-86554 (paragraphs (0020) to (0030)).

In the case of using the optical film of the present invention as a surface protective film on one side of the polarizing film, the optical film can be preferably used for a transmissive, reflective or transflective liquid crystal display in a mode such as twisted nematic (TN), super-twisted nematic (STN), vertical alignment (VA), in-plane switching (IPS) or optically compensated bend cell (OCB).

The VA-mode liquid crystal cell includes (1) a VA-mode liquid crystal cell in a narrow sense where rod-like liquid crystalline molecules are oriented substantially in the vertical alignment at the time of not applying a voltage and oriented substantially in the horizontal alignment at the time of applying a voltage (described in JP-A-2-176625); (2) a (MVA-mode) liquid crystal cell where the VA mode is modified to a multi-domain system for enlarging the viewing angle (described in SID97, Digest of Tech. Papers (preprints), 28, 845 (1997)); (3) a (n-ASM-mode) liquid crystal cell where rod-like liquid crystalline molecules are oriented substantially in the vertical alignment at the time of not applying a voltage and oriented in the twisted multi-domain alignment at the time of applying a voltage (described in preprints of Nippon Ekisho Toronkai (Liquid Crystal Forum of Japan), 58-59 (1998)); and (4) a SURVIVAL-mode liquid crystal cell (reported in LCD International 98).

For the application to a VA-mode liquid crystal cell, a polarizing plate prepared by combining a biaxially stretched triacetyl cellulose film with the optical film of the present invention is preferably used. As for the production method of a biaxially stretched triacetyl cellulose film, the method described, for example, in JP-A-2001-249223 and JP-A-2003-170492 is preferably used.

The OCB-mode liquid crystal cell is a liquid crystal display using a liquid crystal cell of bend alignment mode where rod-like liquid crystalline molecules are aligned substantially in the reverse direction (symmetrically) between the upper part and the lower part of the liquid crystal cell, and this is disclosed in U.S. Pat. Nos. 4,583,825 and 5,410,422. Since rod-like liquid crystalline molecules are aligned symmetrically between the upper part and the lower part of the liquid crystal cell, the liquid crystal cell of bend alignment mode has a self-optically compensating ability. Accordingly, this liquid crystal mode is also called an OCB (Optically Compensatory Bend) liquid crystal mode. A liquid crystal display of bend alignment mode is advantageous in that the response speed is fast.

In the ECB-mode liquid crystal cell, rod-like liquid crystalline molecules are oriented substantially in the horizontal alignment at the time of not applying a voltage. This is most popularly used as a color TFT liquid crystal display and is described in a large number of publications such as EL, PDP, LCD Display, Toray Research Center (2001).

Particularly, in the case of a TN-mode or IPS-mode liquid crystal display, as described in JP-A-2001-100043 and the like, an optical compensation film having an effect of enlarging the viewing angle is preferably used for the protective film on the surface opposite the optical film of the present invention out of front and back two protective films of a polarizing film, because a polarizing plate having an antireflection effect and a viewing angle-enlarging effect with a thickness of one polarizing plate can be obtained.

EXAMPLE 1

The present invention is described below by referring to Examples, but the present invention is not limited thereto. Unless otherwise indicated, the "parts" and "%" are on the mass basis.

A multilayer antireflection film shown below was produced.

(Preparation of Coating Solution for Hardcoat Layer)

The following composition was charged into a mixing tank and stirred to prepare a coating solution for hardcoat layer.

270.0 Parts by mass of poly(glycidyl methacrylate) having a weight average molecular weight of 15,000, 730.0 parts by mass of methyl ethyl ketone, 500.0 parts by mass of cyclohexanone and 50.0 parts by mass of a photopolymerization initiator (Irgacure 184, produced by Ciba Specialty Chemicals) were added to 750.0 parts by mass of trimethylolpropane triacrylate (TMPTA, produced by Nippon Kayaku Co., Ltd.) and stirred. The resulting solution was filtered through a polypropylene-made filter having a pore size of 0.4 μm to prepare a coating solution for hardcoat layer.

(Preparation of Titanium Dioxide Fine Particle Liquid Dispersion)

The titanium dioxide fine particle used was a titanium dioxide fine particle (MPT-129C, produced by Ishihara Sangyo Kaisha, Ltd., $TiO_2:Co_3O_4:Al_2O_3:ZrO_2$=90.5:3.0:4.0:0.5 (by mass)) containing cobalt and being surface-treated with use of aluminum hydroxide and zirconium hydroxide.

After adding 41.1 parts by mass of a dispersant (Chem. 11) shown below and 701.8 parts by mass of cyclohexanone to 257.1 parts by mass of the particle above, the resulting mixture was dispersed by a Dyno mill to prepare a titanium dioxide liquid dispersion having a mass average diameter of 70 nm.

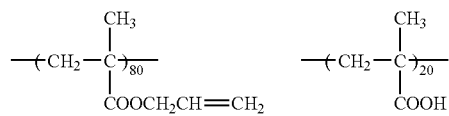

(Preparation of Coating Solution for Medium Refractive Index Layer)

To 99.1 parts by mass of the titanium dioxide liquid dispersion prepared above, 68.0 parts by mass of a mixture (DPHA) of dipentaerythritol pentaacrylate and dipentaerythritol hexaacrylate, 3.6 parts by mass of a photopolymerization initiator (Irgacure 907), 1.2 parts by mass of a photosensitizer (Kayacure DETX, produced by Nippon Kayaku Co., Ltd.), 279.6 parts by mass of methyl ethyl ketone and 1,049.0 parts by mass of cyclohexanone were added and stirred. After thorough stirring, the resulting solution was filtered through a polypropylene-made filter having a pore size of 0.4 μm to prepare a coating solution for medium refractive index layer.

(Preparation of Coating Solution for High Refractive Index Layer)

To 469.8 parts by mass of the titanium dioxide liquid dispersion prepared above, 40.0 parts by mass of a mixture (DPHA, produced by Nippon Kayaku Co., Ltd.) of dipentaerythritol pentaacrylate and dipentaerythritol hexaacrylate, 3.3 parts by mass of a photopolymerization initiator (Irgacure 907, produced by Ciba Specialty Chemicals), 1.1 parts by mass of a photosensitizer (Kayacure DETX, produced by Nippon Kayaku Co., Ltd.), 526.2 parts by mass of methyl ethyl ketone and 459.6 parts by mass of cyclohexanone were added and stirred. The resulting solution was filtered through a polypropylene-made filter having a pore size of 0.4 μm to prepare a coating solution for high refractive index layer.

(Preparation of Coating Solution A for Low Refractive Index Layer)

74.4 Parts by mass of Fluorine-Containing Copolymer P-3 (weight average molecular weight: 50,000) described in JP-A-2004-45462, 4 parts by mass of terminal methacrylate group-containing silicone RMS-033 (produced by Gelest), 3 parts by mass of photoradical generator Irgacure 907 (produced by Ciba Specialty Chemicals) and 18.6 parts by mass of a mixture of dipentaerythritol pentaacrylate and dipentaerythritol hexaacrylate (DPHA, produced by Nippon Kayaku Co., Ltd., average molecular weight: about 560) were added and dissolved in 200 parts by mass of methyl ethyl ketone. The resulting solution was diluted with cyclohexanone and methyl ethyl ketone such that the solid content concentration of the entire coating solution became 6 mass % and the ratio of cyclohexane and methyl ethyl ketone became 3:97, whereby Coating Solution A was prepared.

(Production of Antireflection Film 101)

The coating solution for hardcoat layer prepared above was coated on a 80 μm-thick triacetyl cellulose film (TD80UF, produced by Fuji Photo Film Co., Ltd.) by using a gravure coater. After drying at 100° C., the coating layer was cured by irradiating thereon an ultraviolet ray at a radiation illuminance of 400 mW/cm$^2$ and an irradiation energy amount of 300 mJ/cm$^2$ with use of an air-cooled metal halide lamp of 160 W/cm (manufactured by Eye Graphics Co., Ltd.) while purging the system with nitrogen to provide an atmosphere having an oxygen concentration of 1.0 vol % or less, whereby a 8 μm-thick hardcoat layer was formed.

On the hardcoat layer, the coating solution for medium refractive index layer, the coating solution for high refractive index layer, and Coating Solution A for low refractive index layer were continuously coated by using a gravure coater having three coating stations.

The drying conditions of the medium refractive index layer were 90° C. and 30 seconds, and the ultraviolet curing conditions were such that an air-cooled metal halide lamp of 180 W/cm (manufactured by Eye Graphics Co., Ltd.) was used at a radiation illuminance of 400 mW/cm$^2$ and an irradiation energy amount of 400 mJ/cm$^2$ while purging the system with nitrogen to provide an atmosphere having an oxygen concentration of 1.0 vol % or less.

The medium refractive index layer after curing had a refractive index of 1.630 and a film thickness of 67 nm.

The drying conditions of the high refractive index layer were 90° C. and 30 seconds, and the ultraviolet curing conditions were such that an air-cooled metal halide lamp of 240 W/cm (manufactured by Eye Graphics Co., Ltd.) was used at a radiation illuminance of 600 mW/cm$^2$ and an irradiation energy amount of 400 mJ/cm$^2$ while purging the system with nitrogen to provide an atmosphere having an oxygen concentration of 1.0 vol % or less.

The high refractive index layer after curing had a refractive index of 1.905 and a film thickness of 107 nm.

The drying conditions of the low refractive index layer were 90° C. and 15 seconds, and the ultraviolet curing conditions were such that an air-cooled metal halide lamp of 240 W/cm (manufactured by Eye Graphics Co., Ltd.) was used at a radiation illuminance of 600 mW/cm$^2$ and an irradiation energy amount of 600 mJ/cm$^2$ while purging the system with nitrogen to provide an atmosphere having an oxygen concentration of 0.03 vol % or less.

The low refractive index layer after curing had a refractive index of 1.458 and a film thickness of 85 nm.

(Production of Antireflection Film 102)

Antireflection Film 102 was produced in the same manner as Antireflection Film 101 except that in Sample 101, DPHA of Coating Solution A for low refractive index layer was removed and Fluorine-Containing Copolymer P-3 in the same amount was added instead.

(Production of Antireflection Film 103)

Sample 103 was produced by changing the low refractive index layer of Sample 101 as follows.

(Preparation of Sol Solution a)

In a reactor equipped with a stirrer and a reflux condenser, 120 parts of methyl ethyl ketone, 100 parts of acryloyloxypropyltrimethoxysilane (KBM-5103, produced by Shin-Etsu Chemical Co., Ltd.) and 3 parts of diisopropoxyaluminum ethyl acetoacetate (Kerope EP-12 (trade name), produced by Hope Chemical Co., Ltd.) were added and mixed and after adding thereto 30 parts of ion exchanged water, the mixture was allowed to react at 60° C. for 4 hours. Thereafter, the reaction mixture was cooled to room temperature to obtain Sol Solution a. The mass average molecular weight was 1,600 and in the oligomer or greater polymer components, the components having a molecular weight of 1,000 to 20,000 occupied 100%. Also, the gas chromatography revealed that the raw material acryloyloxy-propyltrimethoxysilane was not remaining at all.

(Preparation of Liquid Dispersion A-1)

30 Parts of acryloyloxypropyltrimethoxysilane (produced by Shin-Etsu Chemical Co., Ltd.) and 1.5 parts of diisopropoxyaluminum ethyl acetate were added and mixed to 500 parts of a hollow silica fine particle sol (isopropyl alcohol silica sol, produced by Catalysts & Chemicals Ind. Co., Ltd., average particle diameter: 60 nm, thickness of shell: 10 nm, silica concentration: 20 mass %, refractive index of silica particle: 1.31, prepared according to Preparation Example 4 of JP-A-2002-79616 by changing the size), and then 9 parts of ion exchanged water was added. After allowing the reaction to proceed at 60° C. for 8 hours, the reaction solution was cooled to room temperature, and 1.8 parts of acetylacetone was added.

While adding methyl ethyl ketone to 500 g of the obtained liquid dispersion to keep nearly constant the silica content, solvent displacement by distillation under reduced pressure was performed at a pressure of 20 kPa. Generation of foreign matters in the liquid dispersion was not observed and when the solid content concentration was adjusted to 20 mass % with methyl ethyl ketone, the viscosity was 5 mPa·s at 25° C. The residual isopropyl alcohol amount in the obtained Liquid Dispersion A-1 was analyzed by gas chromatography and found to be 1.5%.

(Preparation of Coating Solution B for Low Refractive Index Layer)

44.0 Parts by mass of Fluorine-Containing Copolymer P-3 used in Coating Solution A for low refractive index layer, 4 parts by mass of terminal methacrylate group-containing silicone RMS-033 (produced by Gelest) and 3 parts by mass of photoradical generator Irgacure 907 (produced by Ciba Specialty Chemicals) were added and dissolved in 200 parts by mass of methyl ethyl ketone. Thereafter, 25.3 parts by mass (10 parts by mass as the solid content after volatilization of the solvent) of Sol Solution a and 195 parts by mass (39 parts by mass as silica+the solid content of surface treating agent) of Liquid Dispersion A-1 were added. The resulting solution was diluted with cyclohexanone and methyl ethyl ketone such that the solid content concentration of the entire coating solution became 6 mass % and the ratio of cyclohexane and methyl ethyl ketone became 3:97, whereby Coating Solution B for low refractive index layer was prepared.

Using the thus-obtained Coating Solution B for low refractive index layer, Sample 103 was produced by controlledly coating the coating solution as in Sample 101 to give a low refractive index layer thickness of 85 nm. The refractive index of the low refractive index layer after curing was 1.40.

(Production of Antireflection Films 104 to 107)

Antireflection Films 104 to 107 were produced in the same manner as Antireflection Film 103 except that in Antireflection Film 103, the ratio of Fluorine-Containing Copolymer P-3 and DPHA (a mixture of dipentaerythritol pentaacrylate and dipentaerythritol hexaacrylate, produced by Nippon Kayaku Co., Ltd., average molecular weight: about 560) in the low refractive index layer was changed as shown in Table 1.

(Production of Antireflection Film 108)

Sample 108 was produced thoroughly in the same manner as Sample 104 except for changing Fluorine-Containing Copolymer P-3 in the low refractive index layer to Fluorine-Containing Copolymer P-2 (weight average molecular weight: 50,000) described in JP-A-2004-45462.

(Production of Antireflection Film 109)

Antireflection Film 109 was produced in the same manner as Antireflection Film 108 except that in Antireflection Film 108, the ratio of Fluorine-Containing Copolymer P-2 and DPHA (a mixture of dipentaerythritol pentaacrylate and dipentaerythritol hexaacrylate, produced by Nippon Kayaku Co., Ltd., average molecular weight: about 560) in the low refractive index layer was changed as shown in Table 1.

(Production of Antireflection Film 110)

Antireflection Film 110 was produced in the same manner as Antireflection Film 103 except that in Antireflection Film 103, Sol Solution a was removed and Fluorine Containing Copolymer P-3 in the same amount as the solid content was added instead.

(Production of Antireflection Film 111)

Sample 111 was produced by changing the low refractive index layer of Sample 101 as follows.

(Preparation of Coating Solution C for Low Refractive Index Layer)

Coating Solution C for low refractive index layer was prepared by adding 3 parts by mass of cyclohexanone to 100 parts by mass of Opstar JTA113 (a thermal crosslinking fluorine-containing silicone polymer composition (solid content: 6%) using methyl ethyl ketone as the solvent, produced by JSR Corp.).

Using the thus-obtained Coating Solution C for low refractive index layer, Sample 111 was produced by controlledly coating the coating solution as in Sample 101 to give a low refractive index layer thickness of 85 nm. The drying conditions of the low refractive index layer were 120° C. and 12 minutes, and the ultraviolet curing conditions were such that an air-cooled metal halide lamp of 240 W/cm (manufactured by Eye Graphics Co., Ltd.) was used at a radiation illuminance of 120 mW/cm$^2$ and an irradiation energy amount of 120 mJ/cm$^2$ while purging the system with nitrogen to provide an atmosphere having an oxygen concentration of 0.1 vol % or less. The refractive index of the low refractive index layer after curing was 1.45.

(Production of Antireflection Film 112)

Sample 112 was produced by changing the low refractive index layer of Sample 111 as follows.

(Preparation of Coating Solution D for Low Refractive Index Layer)

Coating Solution D for low refractive index layer was prepared by adding 34 parts by mass of cyclohexanone to 933.3 parts by mass (56.0 parts by mass as the solid content) of Opstar JTA113 (a thermal crosslinking fluorine-containing silicone polymer composition (solid content: 6%), produced by JSR Corp.), 195 parts by mass (39.0 parts by mass as silica+the solid content of surface treating agent) of Liquid Dispersion A-1 and 12.65 parts by mass (5.0 parts by mass as the solid content) of Sol Solution a.

Using the thus-obtained Coating Solution D for low refractive index layer, Sample 112 was produced by controlledly coating and curing the coating solution as in Sample 111 to give a low refractive index layer thickness of 85 nm. The refractive index of the low refractive index layer after curing was 1.385.

(Evaluation of Antireflection Film)

The obtained films were evaluated on the following items.

(Evaluation 1) Bias of Particle Filling Factor in Film (SP value)

A 50 nm-thick sliced specimen of each sample was prepared, and the specimen was observed and photographed at a magnification of 150,000 by using a transmission electron microscope. The SP value [(B/A)×100], that is, the ratio of an average particle filling factor (B) in the region of 30% of the film thickness on the upper side opposite the support to an average particle content (A) in the entirety of the low refractive index layer, was calculated. As described above, in the calculation of the particle content in the region of 30% of the film thickness on the upper side, when the particle is partially contained in the region of 30% of the film thickness on the upper side, the content was calculated by the ratio of the area on the cross-sectional photograph.

(Evaluation 2) Percentage of Particle Aggregate on the Surface Side of Film (SA Value)

A 50 nm-thick sliced specimen of each sample was prepared, and the specimen was observed and photographed at a magnification of 150,000 by using a transmission electron microscope. The percentage (SA value) of the area of the region containing a particle aggregate in the region of 30% of the low refractive index layer on the upper side opposite the support was calculated.

(Evaluation 3) Evaluation of Steel Wool Scratch Resistance

A rubbing test was performed by using a rubbing tester under the following conditions.

Environmental conditions of evaluation: 25° C. and 60% RH

Rubbing Material:

A steel wool (No. 0000, manufactured by Nippon Steel Wool K.K.) was wound around a rubbing tip (1 cm×1 cm) of a tester coming into contact with the sample and fixed by a band not to move.

A reciprocal rubbing movement of the sample was made on this rubbing material under the following conditions.

Moving distance (one way): 13 cm
Rubbing speed: 13 cm/sec
Load: 500 g/cm$^2$
Contact area of tip: 1 cm×1 cm
Number of rubbings: 10 reciprocations An oily black ink was applied to the back side of the rubbed sample, and the abrasion in the rubbed portion was observed with an eye by using the reflected light and evaluated according to the following criteria.

○: Abrasion was not recognized at all even when very carefully observed.

○Δ: Faint abrasion was slightly recognized when very carefully observed.

Δ: Faint abrasion was recognized.

ΔX: Medium abrasion was recognized.

X: Abrasion recognizable at the first glance was present.

An oily black ink was applied to the back side of the rubbed sample, and the abrasion in the rubbed portion was observed with an eye by using the reflected light and evaluated according to the following criteria.

○: Abrasion was not recognized at all even when very carefully observed.

○Δ: Faint abrasion was slightly recognized when very carefully observed.

Δ: Faint abrasion was recognized.

ΔX: Medium abrasion was recognized.

X: Abrasion recognizable at the first glance was present.

XX: Abrasion was recognized over the entire surface of film.

(Evaluation 5) Evaluation of Marker Wipability

A circle having a diameter of 1 cm was written on the sample and blacked out by using marker ink No. 700 (M700-T1) with an extra fine tip. The sample was left standing for 24 hours and then rubbed with Bencot (produced by Asahi Kasei Corp.), and whether the marker could be wiped off was evaluated according to the following criteria.

○: Marker stain was not recognized even when very carefully observed.

Δ: Marker stain was slightly recognized.

X: Unremovable stain was detected.

Environmental conditions of evaluation: 25° C. and 60% RH

The evaluation results are shown in Table 1.

TABLE 1

| | Constituent Components of Low Refractive Index | | | | | | | | Segregation of Fine Particle in Film | | Scratch Resistance | | | |
|---|---|---|---|---|---|---|---|---|---|---|---|---|---|---|
| | Fluorine-containing Polymer | | | | | | Irgacure | | SP | SA | Steel | | Marker | |
| No. | P-3 | R-2 | JTA113 | DPHA | Silica | Sol Solution a | 907 | RMS-033 | Value | Value | wool | Eraser | Wipability | Remarks |
| 101 | 74.4 | 0.0 | 0.0 | 18.6 | 0.0 | 0.0 | 3.0 | 4.0 | — | — | ΔX | Δ | Δ | Comparison |
| 102 | 93.0 | 0.0 | 0.0 | 0.0 | 0.0 | 0.0 | 3.0 | 4.0 | — | — | X | Δ | Δ | Comparison |
| 103 | 44.0 | 0.0 | 0.0 | 0.0 | 39.0 | 10.0 | 3.0 | 4.0 | 30 | 20 | ○Δ | ○Δ | ○ | Invention |
| 104 | 35.2 | 0.0 | 0.0 | 8.8 | 39.0 | 10.0 | 3.0 | 4.0 | 30 | 20 | ○Δ | ○Δ | ○ | Invention |
| 105 | 22.0 | 0.0 | 0.0 | 22.0 | 39.0 | 10.0 | 3.0 | 4.0 | 30 | 0 | ○ | ○ | ○ | Invention |
| 106 | 13.2 | 0.0 | 0.0 | 30.8 | 39.0 | 10.0 | 3.0 | 4.0 | 0 | 0 | ○ | ○Δ | ○ | Invention |
| 107 | 0.0 | 0.0 | 0.0 | 44.0 | 39.0 | 10.0 | 3.0 | 4.0 | 75 | 4 | ○Δ | ○ | ○ | Invention |
| 108 | 0.0 | 22.0 | 0.0 | 22.0 | 39.0 | 10.0 | 3.0 | 4.0 | 30 | 0 | ○ | ○ | ○ | Invention |
| 109 | 0.0 | 13.2 | 0.0 | 30.8 | 39.0 | 10.0 | 3.0 | 4.0 | 2 | 0 | ○ | ○Δ | ○ | Invention |
| 110 | 54.0 | 0.0 | 0.0 | 0.0 | 39.0 | 0.0 | 3.0 | 4.0 | 120 | 64 | ○Δ | ΔX | X | Comparison |
| 111 | 0.0 | 0.0 | 100.0 | 0.0 | 0.0 | 0.0 | 0.0 | 0.0 | — | — | X | X | Δ | Comparison |
| 112 | 0.0 | 0.0 | 56.0 | 0.0 | 39.0 | 5.0 | 0.0 | 0.0 | 0 | 0 | ○ | ○Δ | ○ | Invention |

Note:
The constituent components of the low refractive index layer are shown by mass % based on the entire solid content of the layer in the uncured state.

(Evaluation 4) Evaluation of Eraser Rubbing Scratch Resistance

A rubbing test was performed by using a rubbing tester under the following conditions.

Environmental conditions of evaluation: 25° C. and 60% RH

Rubbing Material:

A plastic eraser (MONO, produced by Tombo Pencil Co., Ltd.) was fixed to the rubbing tip (1 cm×1 cm) of a tester coming into contact with the sample.

Moving distance (one way): 4 cm
Rubbing speed: 2 cm/sec
Load: 500 g/cm$^2$
Contact area of tip: 1 cm×1 cm
Number of rubbings: 100 reciprocations The results in Table 1 reveal the followings.

The samples containing the fine particle of the present invention and having an SP value and an SA value within the scope of the present invention are excellent in all of steel wool scratch resistance, eraser scratch resistance and antifouling property. Also, the samples using the a compound having an average molecular weight of 5,000 or less (DPHA, Sol a) and a binder having an average molecular weight of 5,000 or more (P2, P3, JTA113) in combination are more improved in these performances (comparison of Sample 110 with Samples 103 to 109). Furthermore, the sample containing a compound having a fluorocarbon structure is improved in the steel wool scratch resistance (comparison of Sample 107 with Sample 105).

EXAMPLE 2

Samples were produced by changing the inorganic fine particle and the solvent composition of the low refractive index layer in Sample 104 of Example 1 as shown in Table 2.

reaction solution was cooled to room temperature. When the solid content concentration was adjusted to 20 mass % with methyl ethyl ketone, the viscosity was 5 mPa·s at 25° C.

The evaluations were performed by following Example 1 and the results are shown together in Table 2.

TABLE 2

| | Constituent Components of Low Refractive Index Layer | | Segregation in Fine Particle in Film | | Scratch Resistance | | |
|---|---|---|---|---|---|---|---|
| No. | Cyclohexanone/ Methyl Ethyl Ketone | Silica Liquid Dispersion | SP Value | SA Value | Steel Wool | Eraser | Remarks |
| 201 | 0/100 | (A-2) | 50 | 40 | ○△ | ○△ | Invention |
| 202 | 3/97 | (A-2) | 30 | 0 | ○ | ○ | Invention |
| 203 | 10/90 | (A-2) | 25 | 0 | ○ | ○ | Invention |
| 204 | 30/70 | (A-2) | 30 | 20 | ○△ | ○△ | Invention |
| 205 | 10/90 | (B-1) | 30 | 20 | ○△ | ○△ | Invention |
| 206 | 10/90 | (C-1) | 30 | 16 | ○△ | ○△ | Invention |

As for the solvent composition, at the time of adjusting the solid content concentration of the entire coating solution to 6 mass %, the adjustment was performed by changing the amount of cyclohexanone. The following silica Particles were used.

(Preparation of Liquid Dispersion A-2)

Dispersion A-2 was prepared thoroughly in the same manner as Liquid Dispersion A-1 except for decreasing the amount of acryloyloxypropyltrimethoxysilane to 20 parts and newly adding 10 parts of tridecafluorooctyltrimethoxysilane (produced by GE Toshiba Silicones Co., Ltd.). Generation of foreign matters in the liquid dispersion was not observed and when the solid content concentration was adjusted to 20 mass % with methyl ethyl ketone, the viscosity was 5 mPa·s at 25° C. The residual isopropyl alcohol amount in the obtained final liquid dispersion was analyzed by gas chromatography and found to be 1.5 mass %.

(Preparation of Liquid Dispersion B-1)

30 Parts of acryloyloxypropyltrimethoxysilane and 1.5 parts of diisopropoxyaluminum ethyl acetate were added and mixed to 333 parts of a silica fine particle sol (isopropyl alcohol silica sol, produced by Nissan Chemicals Industries, Ltd., average particle diameter: 50 nm, silica concentration: 30%), and then 9 parts of ion exchanged water was added. After allowing the reaction to proceed at 60° C. for 8 hours, the reaction solution was cooled to room temperature, and 1.8 parts of acetylacetone was added. While adding methyl ethyl ketone to 333 g of the obtained liquid dispersion to keep nearly constant the silica content, solvent displacement by distillation under reduced pressure was performed at a pressure of 20 kPa. Generation of foreign matters in the liquid dispersion was not observed and when the solid content concentration was adjusted to 20% with methyl ethyl ketone, the viscosity was 6 mPa·s at 25° C. The residual isopropyl alcohol amount in the obtained liquid dispersion was analyzed by gas chromatography and found to be 1.5 mass %.

(Preparation of Liquid Dispersion C-1)

30 Parts of acryloyloxypropyltrimethoxysilane was added to 333 parts of a silica fine particle sol (methyl ethyl ketone sol, produced by Nissan Chemicals Industries, Ltd., average particle diameter: 50 nm, silica concentration: 30%). After allowing the reaction to proceed at 60° C. for 8 hours, the The results in Table 2 reveal the followings.

When cyclohexanone and methyl ethyl ketone are used in combination for the coating solution solvent, the silica particle segregates to the lower part of the low refractive index layer and the scratch resistance is enhanced. Also, when a surface-treated hollow silica is used, excellent scratch resistance is obtained.

EXAMPLE 3

A multilayer antireflection film shown below was produced.

| (Preparation of Coating Solution A for Hardcoat Layer) | |
|---|---|
| PET-30 | 50.0 g |
| Irgacure 184 | 2.0 g |
| SX-350 (30%) | 1.5 g |
| Crosslinked acryl-styrene particle (30%) | 13.9 g |
| FP-132 | 0.075 g |
| KBM-5103 | 10.0 g |
| Toluene | 38.5 g |

The mixed solution above was filtered through a polypropylene-made filter having a pore size of 30 μm to prepare a coating solution for hardcoat layer.

The compounds used are shown below.

PET-30:

A mixture of pentaerythritol triacrylate and pentaerythritol tetraacrylate (produced by Nippon Kayaku Co., Ltd.).

Irgacure 184:

A polymerization initiator (produced by Ciba Specialty Chemicals).

SX-350:

A crosslinked polystyrene particle having an average particle diameter of 3.5 μm (refractive index: 1.60, produced by The Soken Chemical & Engineering Co., Ltd., a 30% toluene liquid dispersion, used after dispersion by a polytron disperser at 10,000 rpm for 20 minutes).

Crosslinked Acryl-styrene Particle:

Average particle diameter: 3.5 μm (refractive index: 1.55, produced by The Soken Chemical & Engineering Co., Ltd., a 30% toluene liquid dispersion, used after dispersion by a polytron disperser at 10,000 rpm for 20 minutes).

FP-132: Fluorine-based Surface Modifier.

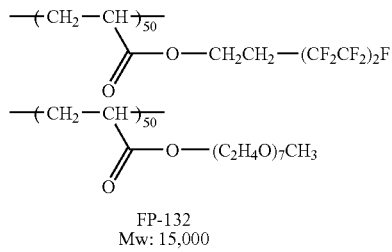

FP-132
Mw: 15,000

KBM-5103:

Acryloyloxypropyltrimethoxysilane (produced by Shin-Etsu Chemical Co., Ltd.).

(Coating of Hardcoat Layer)

A 80 μm-thick triacetyl cellulose film (TAC-TD80U, produced by Fuji Photo Film Co., Ltd.) in a roll form was unrolled, and Coating Solution A for hardcoat layer was coated directly thereon by using a doctor blade and a microgravure roll having a diameter of 50 mm and having a gravure pattern with a line number of 180 lines/inch and a depth of 40 μm under the conditions of a gravure roll rotation number of 30 rpm and a transportation speed of 30 m/min. After drying at 60° C. for 150 seconds, the coated layer was cured by irradiating thereon an ultraviolet ray at a radiation illuminance of 400 mW/cm$^2$ and an irradiation energy amount of 250 mJ/cm$^2$ with use of an air-cooled metal halide lamp of 160 W/cm (manufactured by Eye Graphics Co., Ltd.) in an oxygen concentration of 0.1% under nitrogen purging, thereby forming a layer having a thickness of 6 μm. The resulting film was taken up. The surface roughness of the thus-produced sample Hardcoat 301 was Ra=0.18 μm and Rz=1.40 μm, and the haze was 35%.

The low refractive index layers of Examples 1 and 2 each was coated on Hardcoat 301, and the evaluations were performed by following Examples 1 and 2, as a result, it was found that according to the present invention, an antireflection film excellent in the scratch resistance and antifouling property can be obtained.

EXAMPLE 4

(Preparation of Coating Solution for Hardcoat Layer)

100 Parts by mass of Desolite Z7404 (zirconia fine particle-containing hardcoat composition, produced by JSR Corp.), 31 parts by mass of DPHA (UV curable resin, produced by Nippon Kayaku Co., Ltd.), 10 parts by mass of KBM-5103 (silane coupling agent, produced by Shin-Etsu Chemical Co., Ltd.), 8.9 parts by mass of KE-P150 (1.5-μm silica particle, produced by Nippon Shokubai Co., Ltd.), 3.4 parts by mass of MXS-300 (3-μm crosslinked PMMA particle, produced by The Soken Chemical & Engineering Co., Ltd.), 29 parts by mass of MEK and 13 parts by mass of MIBK were charged into a mixing tank and stirred to prepare a coating solution for hardcoat layer.

(Production of Antireflection Film)

A triacetyl cellulose film (TD80U, produced by Fuji Photo Film Co., Ltd.) in a roll form was unrolled as the support, and the coating solution for hardcoat layer prepared above was coated thereon by using a doctor blade and a microgravure roll having a diameter of 50 mm and having a gravure pattern with a line number of 135 lines/inch and a depth of 60 μm under the condition of a transportation speed of 10 m/min. After drying at 60° C. for 150 seconds, the coated layer was cured by irradiating thereon an ultraviolet ray at a radiation illuminance of 400 mW/cm and an irradiation energy amount of 250 mJ/cm$^2$ with use of an air-cooled metal halide lamp of 160 W/cm (manufactured by Eye Graphics Co., Ltd.) under nitrogen purging, thereby forming a hardcoat layer. The resulting film was taken up. By adjusting the rotation number of the gravure roll to give a hardcoat layer thickness of 4.0 μm after curing, Hardcoat 401 was produced. The surface roughness of the thus-obtained Hardcoat 401 was Ra=0.02 μm, RMS=0.03 μm and Rz=0.25 μm (Ra (centerline average roughness), RMS (root-mean-square roughness) and Rz (n point average roughness) were measured by scanning probe microscope system SPI3800 (manufactured by Seiko Instruments Inc.).

The low refractive index layers of Examples 1 and 2 each was coated on Hardcoat 401 and using the resulting film, a sample subjected to saponification treatment and polarizing plate processing described below was produced. The evaluations of these samples were performed by following Example 1, as a result, it was found that according to the present invention, an antireflection film having strong scratch resistance can be obtained.

(Saponification Treatment of Antireflection Film)

An aqueous 1.5 mol/liter sodium hydroxide solution was prepared and kept at 55° C. Separately, an aqueous 0.005 mol/liter N dilute sulfuric acid solution was prepared and kept at 35° C. The produced antireflection film was dipped in the aqueous sodium hydroxide solution for 2 minutes and then dipped in water to thoroughly wash out the aqueous sodium hydroxide solution. Subsequently, the film was dipped in the aqueous dilute sulfuric acid solution for 1 minute and then dipped in water to thoroughly wash out the aqueous dilute sulfuric acid solution. Finally, the sample was thoroughly dried at 120° C.

In this way, a saponified antireflection film was produced.

(Production of Polarizing Plate with Antireflection Film)

A polarizing film was produced by adsorbing iodine to a stretched polyvinyl alcohol film. The saponified antireflection film was laminated on one surface of the polarizing film by using a polyvinyl alcohol-based adhesive such that the support side (triacetyl cellulose) of the antireflection film came to the polarizing film side. Also, a viewing angle enlarging film (Wide View Film SA 12B, produced by Fuji Photo Film Co., Ltd.) having an optical compensation layer in which the disc plane of the discotic structural unit is inclined with respect to the transparent support plane and the angle made by the disc plane of the discotic structural unit and the transparent support plane is changed in the depth direction of the optically anisotropic layer, was subjected to a saponification treatment and laminated on another surface of the polarizing film by using a polyvinyl alcohol-based adhesive. In this way, a polarizing plate was produced.

EXAMPLE 5

Samples were produced as in Examples 1 to 4 by changing the coating method of all layers from a gravure coater to a die coater, and the evaluations were performed by following Examples 1 to 4. As a result, it was found that the samples produced by using a die coater according to the present invention are also excellent in the coated surface state and assured of low reflectance and in these films, a coating film excellent in the scratch resistance and antifouling property can be formed.

EXAMPLE 6

The samples of Examples 1 and 4 each was laminated on the surface glass plate of an organic EL display through a pressure-sensitive adhesive, as a result, the reflection on the glass surface was suppressed and a display having high visibility was obtained.

EXAMPLE 7

(Preparation of Coating Solution E for Low Refractive Index Layer)

35.2 Parts by mass of Fluorine-Containing Copolymer P-3 used in Coating Solution A for low refractive index layer of Example 1, 4 parts by mass of terminal methacrylate group-containing silicone RMS-033 (produced by Gelest), 3 parts by mass of photoradical generator Irgacure 907 (produced by Ciba Specialty Chemicals) and 8.8 parts by mass of a mixture of dipentaerythritol pentaacrylate and dipentaerythritol hexaacrylate (DPHA, produced by Nippon Kayaku Co., Ltd., average molecular weight: about 560) were added and dissolved in 200 parts by mass of methyl ethyl ketone. Thereafter, 25.3 parts by mass (10 parts by mass as the solid content after volatilization of the solvent) of Sol Solution a and 195 parts by mass (39 parts by mass as silica+the solid content of surface treating agent) of Liquid Dispersion A-1 prepared in Example 1 were added. The resulting solution was diluted with butoxyethanol, cyclohexane and methyl ethyl ketone such that the solid content concentration of the entire coating solution became 6 mass % and the ratio of butoxyethanol, cyclohexane and methyl ethyl ketone became 5:5:90, whereby Coating Solution E was prepared.

(Preparation of Coating Solution F for Low Refractive Index Layer)

195 Parts by mass (39.0 parts by mass as silica+the solid content of surface treating agent) of Liquid Dispersion A-1 and 12.65 parts by mass (5.0 parts by mass as the solid content) of Sol Solution a were added to 933.3 parts by mass (56.0 parts by mass as the solid content) of Opstar JTA113 (a thermal crosslinking fluorine-containing silicone polymer composition (solid content: 6%), produced by JSR Corp.). The resulting solution was diluted with isopropyl alcohol, cyclohexane and methyl ethyl ketone such that the solid content concentration of the entire coating solution became 6 mass % and the ratio of isopropyl alcohol, cyclohexane and methyl ethyl ketone became 3:7:90, whereby Coating Solution F was prepared.

(Production of Antireflection Films 701 to 705)

Coating Solution E for low refractive index layer was coated on Hardcoat 401 of Example 4 by a gravure coater to have a thickness of 100 nm after drying. By changing the temperature and air volume during drying and varying the evaporation rate of the solvent between about 10 seconds and 3 minutes, Antireflection Films 701 to 705 differing in the state of silica particle in the film were produced.

The ultraviolet curing conditions of the low refractive index layer were such that an air-cooled metal halide lamp of 240 W/cm (manufactured by Eye Graphics Co., Ltd.) was used at a radiation illuminance of 600 mW/cm$^2$ and an irradiation energy amount of 600 mJ/cm$^2$ while purging the system with nitrogen to provide an atmosphere having an oxygen concentration of 0.03 vol % or less.

(Production of Antireflection Films 706 to 711)

Coating Solution F for low refractive index layer was coated on Hardcoat 401 of Example 4 by a gravure coater to have a thickness of 100 nm after drying. By changing the temperature and air volume during drying and varying the evaporation rate of the solvent between about 10 seconds and 3 minutes, Antireflection Films 706 to 711 differing in the state of silica particle in the film were produced.

The ultraviolet curing conditions of the low refractive index layer were such that an air-cooled metal halide lamp of 240 W/cm (manufactured by Eye Graphics Co., Ltd.) was used at a radiation illuminance of 120 mW/cm$^2$ and an irradiation energy amount of 120 mJ/cm$^2$ while purging the system with nitrogen to provide an atmosphere having an oxygen concentration of 0.1 vol % or less. The thermal curing after ultraviolet curing was performed at 120° C. for 10 minutes.

(Evaluation of Antireflection Film)

The obtained films were subjected to a saponification treatment by following Example 4. Using the saponified films, the evaluations of SP value, SA value and steel wool scratch resistance were performed by following Example 1. In addition, the following evaluation of antifouling durability was performed.

(Evaluation 6) Antifouling Durability Test

A circle having a diameter of 5 mm was written on the sample and blacked out by using marker ink No. 700 (M700-T1) with an extra fine tip in an environment of 25° C. and 60% RH. The sample was dried for 3 minutes and then subjected to a marker stain-wiping off test using a rubbing tester under the following conditions.

Environmental conditions of evaluation: 25° C. and 60% RH

Rubbing Material:

Bencot (produced by Asahi Kasei Corp.) was wound around a rubbing tip (1 cm×1 cm) of a tester coming into contact with the sample and fixed by a band not to move. A reciprocal rubbing movement of the sample was made on this rubbing material under the following conditions.

Moving distance (one way): 5 cm

Rubbing speed: 10 cm/sec

Load: 500 g/cm$^2$

Contact area of tip: 1 cm×1 cm

Number of rubbings: 10 reciprocations

The rubbed sample was observed and whether the marker stain came off was evaluated. When the marker stain came off, the operation of making a marker stain and performing the wiping off test was again repeated under the above-described conditions. The same sample was evaluated four times and the average number of operations where the marker stain could be wiped off was defined as the number of antifouling durability times.

The evaluation results are shown in Table 3.

TABLE 3

| No. | Coating Solution for Low Refractive Index Layer | Segregation of Fine Particle in Film | | Scratch Resistance | Antifouling | Remarks |
| --- | --- | --- | --- | --- | --- | --- |
| | | SP Value | SA Value | Steel Wool | Durability | |
| 701 | E | 100 | 50 | ΔX | 0.5 | Comparison |
| 702 | E | 85 | 40 | ○Δ | 8 | Invention |
| 703 | E | 65 | 30 | ○ | 15 | Invention |
| 704 | E | 40 | 25 | ○ | 25 | Invention |
| 705 | E | 20 | 20 | ○ | 30 | Invention |
| 706 | F | 100 | 50 | X | 1 | Comparison |
| 707 | F | 85 | 40 | ○Δ | 9 | Invention |
| 708 | F | 65 | 30 | ○ | 16 | Invention |
| 709 | F | 40 | 25 | ○ | 27 | Invention |
| 710 | F | 20 | 20 | ○ | 30 | Invention |
| 711 | F | 0 | 0 | ○ | 35 | Invention |

As seen from Table 3, the samples in which the SP value and SA value of the film fall within the scope of the present invention are excellent in the scratch resistance and antifouling durability. In particular, it is apparent that the antifouling durability is greatly improved.

EXAMPLE 8

Examples in the following are related to a low refractive index layer containing an electrically conducting fine particle. More specifically, these Examples are related to a method of coating one layer of a coating solution containing an electrically conducting fine particle and a low refractive index fluorine-containing material, and segregating the electrically conducting fine particle to the lower part, thereby producing an electrically conducting antireflection film excellent in the electrical conductivity and reduced in the reflectance.

(Preparation of Coating Solution A for Electrically Conducting Layer)

5.7 Parts by mass (2.38 parts by mass as the solid content) of Sol Solution a used in Example 1, 25.4 parts by mass of antimony-doped tin oxide-containing liquid dispersion SNS-10M (inorganic content: 19.7%, dispersant: 10.7% (partially bonded to the particle through a covalent bond), solvent: methyl ethyl ketone, produced by Ishihara Sangyo Kaisha, Ltd.), 14.0 parts by mass of cyclohexanone, 10.0 parts by mass of methoxypropanol and 10.0 parts by mass of butoxyethanol were mixed with 166.7 parts by mass of Opstar JTA113 (a thermal crosslinking fluorine-containing silicone polymer composition (solid content: 6%), solvent: methyl ethyl ketone, produced by JSR Corp.). The resulting mixed solution was diluted with methyl ethyl ketone to give a solid content concentration of 5.0%, thereby preparing Coating Solution A for electrically conducting layer.

(Preparation of Coating Solution B for Electrically Conducting Layer)

9.9 Parts by mass (4.0 parts by mass as the solid content) of Sol Solution a used in Example 1, 125 parts by mass of antimony-doped tin oxide-containing liquid dispersion Desolite KZ6805 (electrically conducting hardcoat agent with a solid content of 5%, inorganic content in the solid content: 80%, using an acrylate-based binder, solvent: methyl ethyl ketone, produced by JSR Corp.), 14.0 parts by mass of cyclohexanone, 10.0 parts by mass of methoxypropanol and 10.0 parts by mass of butoxyethanol were mixed with 166.7 parts by mass of Opstar JTA113 (a thermal crosslinking fluorine-containing silicone polymer composition (solid content: 6%), solvent: methyl ethyl ketone, produced by JSR Corp.). The resulting mixed solution was diluted with methyl ethyl ketone to give a solid content concentration of 5.0%, thereby preparing Coating Solution B for electrically conducting layer.

(Preparation of Coating Solution C for Electrically Conducting Layer)

8.0 Parts by mass of Fluorine-Containing Copolymer P-3 (weight average molecular weight: 50,000) used in Coating Solution A for low refractive index layer of Example 1, 0.3 parts by mass of terminal methacrylate group-containing silicone RMS-033 (produced by Gelest), 0.3 parts by mass of photoradical generator Irgacure 907 (trade name) and 8.8 parts by mass of a mixture of dipentaerythritol pentaacrylate and dipentaerythritol hexaacrylate (DPHA, produced by Nippon Kayaku Co., Ltd., average molecular weight: about 560) were added and dissolved in 30 parts by mass of methyl ethyl ketone. Thereafter, 5.7 parts by mass (2.38 parts by mass as the solid content after volatilization of the solvent) of Sol Solution a used in Example 1, 25.4 parts by mass of antimony-doped tin oxide-containing liquid dispersion SNS-10M (inorganic content: 19.7%, dispersant: 10.7% (partially bonded to the particle through a covalent bond), solvent: methyl ethyl ketone, produced by Ishihara Sangyo Kaisha, Ltd.), 14.0 parts by mass of cyclohexanone, 10.0 parts by mass of methoxypropanol and 10.0 parts by mass of butoxyethanol were mixed, and the resulting mixed solution was diluted with methyl ethyl ketone to give a solid content concentration of 5.0%, thereby preparing Coating Solution C for electrically conducting layer.

(Preparation of Coating Solution D for Electrically Conducting Layer)

12.3 Parts by mass of Fluorine-Containing Copolymer P-3 (weight average molecular weight: 50,000) used in Coating Solution A for low refractive index layer of Example 1, 0.3 parts by mass of terminal methacrylate group-containing silicone RMS-033 (produced by Gelest) and 0.3 parts by mass of photoradical generator Irgacure 907 (produced by Ciba Specialty Chemicals) were added and dissolved in 30 parts by mass of methyl ethyl ketone. Thereafter, 25.4 parts by mass of antimony-doped tin oxide-containing liquid dispersion SNS-10M (inorganic content: 19.7%, dispersant: 10.7% (partially bonded to the particle through a covalent bond), solvent: methyl ethyl ketone, produced by Ishihara Sangyo Kaisha, Ltd.), 14.0 parts by mass of cyclohexanone, 10.0 parts by mass of methoxypropanol and 10.0 parts by mass of butoxyethanol were mixed, and the resulting mixed solution was diluted with methyl ethyl ketone to give a solid content concentration of 7.0%, thereby preparing Coating Solution D for electrically conducting layer.

(Preparation of Coating Solution E for Electrically Conducting Layer)

12.3 Parts by mass of a mixture of dipentaerythritol pentaacrylate and dipentaerythritol hexaacrylate (DPHA, produced by Nippon Kayaku Co., Ltd., average molecular weight: about 560), 0.3 parts by mass of terminal methacrylate group-containing silicone RMS-033 (produced by Gelest) and 0.3 parts by mass of photoradical generator Irgacure 907 (produced by Ciba Specialty Chemicals) were added and dissolved in 30 parts by mass of methyl ethyl ketone. Thereafter, 5.7 parts by mass (2.38 parts by mass as the solid content) of Sol Solution a used in Example 1, 25.4 parts by mass of antimony-doped tin oxide-containing liquid dispersion SNS-10M (inorganic content: 19.7%, dispersant: 10.7% (partially bonded to the particle through a covalent bond), solvent: methyl ethyl ketone, produced by Ishihara Sangyo Kaisha, Ltd.), 14.0 parts by mass of cyclohexanone, 10.0 parts by mass of methoxypropanol and 10.0 parts by mass of butoxyethanol were mixed, and the resulting mixed solution was diluted with methyl ethyl ketone to give a solid content concentration of 7.0%, thereby preparing Coating Solution E for electrically conducting layer.

(Production of Electrically Conducting Antireflection Films 801 to 805)

Using the thus-obtained Coating Solutions A to E for electrically conducting layer, Samples 801 to 805 were produced by controlledly coating the coating solution on Hardcoat 301 of Example 3 to have a film thickness of 170 nm. The drying conditions of the electrically conducting layer were 90° C. and 30 seconds, and the ultraviolet curing conditions were such that an air-cooled metal halide lamp of 240 W/cm (manufactured by Eye Graphics Co., Ltd.) was used at a radiation illuminance of 120 mW/cm$^2$ and an irradiation energy amount of 240 mJ/cm$^2$ while purging the system with nitrogen to provide an atmosphere having an oxygen concentration of 0.1 vol % or less. Samples 801 and 802 were further heated under the conditions of 120° and 20 minutes.

(Preparation of Comparative Coating Solution F for Electrically Conducting Layer)

9.0 Parts by mass of a mixture of dipentaerythritol pentaacrylate and dipentaerythritol hexaacrylate (DPHA, produced by Nippon Kayaku Co., Ltd., average molecular weight: about 560), 1.0 part by mass of photoradical generator Irgacure 907 (trade name), 14.0 parts by mass of cyclohexanone, 10.0 parts by mass of methoxypropanol and 10.0 parts by mass of butoxyethanol were mixed with 100 parts by mass of antimony-doped tin oxide-containing liquid dispersion SNS-10M (inorganic content: 19.7%, dispersant: 10.7% (partially bonded to the particle through a covalent bond), solvent: methyl ethyl ketone, produced by Ishihara Sangyo Kaisha, Ltd.), and the resulting mixed solution was diluted with methyl ethyl ketone to give a solid content concentration of 7.0%, thereby preparing Coating Solution F for electrically conducting layer.

(Production of Comparative Electrically Conducting Antireflection Films 806 and 807)

The thus-obtained Coating Solution F for electrically conducting layer was controlledly coated on Hardcoat 301 of Example 3 to have a film thickness of 85 nm. The drying conditions of the electrically conducting layer were 90° C. and 30 seconds, and the ultraviolet curing conditions were such that an air-cooled metal halide lamp of 240 W/cm (manufactured by Eye Graphics Co., Ltd.) was used at a radiation illuminance of 120 mW/cm$^2$ and an irradiation energy amount of 240 mJ/cm$^2$ while purging the system with nitrogen to provide an atmosphere having an oxygen concentration of 0.1 vol % or less. On this electrically conducting layer, Coating Solution C for low refractive index layer used in Example 1 was controlledly coated as in Sample 111 to give a low refractive index layer thickness of 85 nm, thereby producing Sample 806. The drying conditions of the low refractive index layer were 120° C. and 12 minutes, and the ultraviolet curing conditions were such that an air-cooled metal halide lamp of 240 W/cm (manufactured by Eye Graphics Co., Ltd.) was used at a radiation illuminance of 120 mW/cm and an irradiation energy amount of 120 mJ/cm$^2$ while purging the system with nitrogen to provide an atmosphere having an oxygen concentration of 0.1 vol % or less.

Also, Sample 807 was produced by controlledly coating and curing Coating Solution C for low refractive index layer used in Example 1 on Hardcoat 301 of Example 3 as in Sample 111 to give a low refractive index layer thickness of 85 mm.

(Evaluation of Antireflection Film)

The film samples obtained above were subjected to evaluations of SP value and SA value by following (Evaluation 1) and (Evaluation 2) of Example 1 and additionally subjected to evaluations of the following items.

(Evaluation 6) Average Reflectance

The spectral reflectance was measured at an incident angle of 5° in the wavelength region of 380 to 780 nm by using a spectrophotometer (manufactured by JASCO Corp.). The average reflectance of 450 to 650 nm was used for the result.

(Evaluation 7) Measurement of logSR (Surface Resistance)

After moisture conditioning at 25° C. and 60% RH for 2 hours, the surface resistance value (SR) was measured by the circular electrode method. The common logarithm of SR was determined, and logSR was calculated therefrom.

The evaluation results are shown in Table 4.

TABLE 4

| No. | Segregation of Fine Particle in Film | | Average Reflectance | LogSR | Remarks |
| --- | --- | --- | --- | --- | --- |
| | SP Value | SA Value | | | |
| 801 | 0 | 0 | 1.36 | 8.1 | Invention |
| 802 | 2 | 0 | 1.36 | 8.3 | Invention |
| 803 | 0 | 0 | 1.35 | 8.0 | Invention |
| 804 | 110 | 51 | 3.50 | 9.1 | Comparison |
| 805 | 98 | 48 | 3.60 | 11.1 | Comparison |
| 806 | — | — | 1.36 | 8.1 | Comparison |
| 807 | — | — | 1.80 | 14.1 | Comparison |

The results in Table 4 reveal the followings.

When the fine particle of the present invention is contained and the SP value and SA value fall within the scope of the present invention, an antireflection film assured of low reflectance and excellent electrical conductivity is obtained. Also, according to the present invention, the same effect as in the sample produced by sequentially coating two layers of electrically conducting layer and low refractive index layer (Sample 806) can be obtained by coating one layer, and the production efficiency can be enhanced.

EXAMPLE 9

The electrically conducting layer prepared in Example 8 was coated on Hardcoat 401 of Example 4 and when the same evaluations as in Example 8 were performed, nearly the same results are obtained.

EXAMPLE 10

(Preparation of Coating Solution B for Hardcoat Layer)

A coating solution was prepared by excluding the SX-350 dispersion and the crosslinked acryl-styrene particle dispersion from Coating Solution A for hardcoat layer used in Example 3.

(Preparation of Coating Solution G for Electrically Conducting Layer)

5.7 Parts by mass (2.38 parts by mass as the solid content) of Sol Solution a used in Example 1, 15.2 parts by mass of antimony-doped tin oxide-containing liquid dispersion SNS-10M (inorganic content: 19.7%, dispersant: 10.7% (partially bonded to the particle through a covalent bond), solvent: methyl ethyl ketone, produced by Ishihara Sangyo Kaisha, Ltd.), 19.3 parts by mass of Sol Liquid Dispersion A-1 (hollow silica liquid dispersion, solid content: 20%) of Example 1, 14.0 parts by mass of cyclohexanone, 10.0 parts by mass of methoxypropanol and 10.0 parts by mass of butoxyethanol were mixed with 166.7 parts by mass of Opstar JTA113 (a thermal crosslinking fluorine-containing silicone polymer composition (solid content: 6%), solvent: methyl ethyl ketone, produced by JSR Corp.). The resulting mixed solution was diluted with methyl ethyl ketone to give a solid content concentration of 5.0%, thereby preparing Coating Solution G for electrically conducting layer.

(Production of Hardcoat Film 1001)

A 80 μm-thick triacetyl cellulose film (TAC-TD80U, produced by Fuji Photo Film Co., Ltd.) in a roll form was unrolled, and Coating Solution B for hardcoat layer was coated thereon by using a microgravure roll and a doctor blade. After drying at 60° C. for 150 seconds, the coated layer was cured by irradiating thereon an ultraviolet ray at an illumination intensity of 120 mW/cm$^2$ and an irradiation dose of 120 mJ/cm$^2$ with use of an air-cooled metal halide lamp of 160 W/cm (manufactured by Eye Graphics Co., Ltd.) in an oxygen concentration of 0.1% under nitrogen purging, thereby forming a layer having a film thickness of 6 μm. The resulting film was taken up. The surface roughness of the thus-obtained Clear Hardcoat Film 1001 was Ra=0.05 μm and Rz=0.22 μm. Using this hardcoat, an antireflection film having the following construction was produced.

(Production of Antireflection Film 1001)

Coating Solution C for low refractive index layer was coated on Hardcoat 1001 to have a film thickness of 95 nm. The drying conditions of the low refractive index layer were 110° C. and 10 minutes, and the ultraviolet curing conditions were such that an air-cooled metal halide lamp of 240 W/cm (manufactured by Eye Graphics Co., Ltd.) was used at a radiation illuminance of 120 mW/cm$^2$ and an irradiation dose of 240 mJ/cm$^2$ in terms of irradiation energy amount while purging the system with nitrogen to provide an atmosphere having an oxygen concentration of 0.1 vol % or less.

(Production of Antireflection Film 1002)

Coating Solution A for electrically conducting layer was controlledly coated on Hardcoat 1001 to have a film thickness of 180 nm. The drying conditions of the electrically conducting layer were 90° C. and 30 seconds, and the ultraviolet curing conditions were such that an air-cooled metal halide lamp of 240 W/cm (manufactured by Eye Graphics Co., Ltd.) was used at a radiation illuminance of 120 mW/cm and an irradiation dose of 240 mJ/cm$^2$ in terms of irradiation energy amount while purging the system with nitrogen to provide an atmosphere having an oxygen concentration of 0.1 vol % or less. Thereafter, the sample was further heated under the conditions of 110° C. and 10 minutes.

(Production of Antireflection Film 1003)

Coating Solution G for electrically conducting layer was controlledly coated on Hardcoat 1001 to have a film thickness of 180 nm. The drying conditions of the electrically conducting layer were 90° C. and 30 seconds, and the ultraviolet curing conditions were such that an air-cooled metal halide lamp of 240 W/cm (manufactured by Eye Graphics Co., Ltd.) was used at a radiation illuminance of 120 mW/cm and an irradiation dose of 240 mJ/cm$^2$ in terms of irradiation energy amount while purging the system with nitrogen to provide an atmosphere having an oxygen concentration of 0.1 vol % or less. Thereafter, the sample was further heated under the conditions of 110° C. and 10 minutes.

(Production of Antireflection Film 1004)

Comparative Coating Solution F for electrically conducting layer was controlledly coated on Hardcoat 1001 to have a film thickness of 85 nm. The drying conditions of the electrically conducting layer were 90° C. and 30 seconds, and the ultraviolet curing conditions were such that an air-cooled metal halide lamp of 240 W/cm (manufactured by Eye Graphics Co., Ltd.) was used at a radiation illuminance of 120 mW/cm$^2$ and an irradiation dose of 240 mJ/cm$^2$ in terms of irradiation energy amount while purging the system with nitrogen to provide an atmosphere having an oxygen concentration of 0.1 vol % or less.

On this electrically conducting layer, Coating Solution C for low refractive index layer was controlledly coated to have a film thickness of 95 nm. The drying conditions of the low refractive index layer were 110° C. and 10 minutes, and the ultraviolet curing conditions were such that an air-cooled metal halide lamp of 240 W/cm (manufactured by Eye Graphics Co., Ltd.) was used at a radiation illuminance of 120 mW/cm$^2$ and an irradiation dose of 240 mJ/cm$^2$ in terms of irradiation energy amount while purging the system with nitrogen to provide an atmosphere having an oxygen concentration of 0.1 vol % or less.

(Evaluation of Antireflection Film)

The thus-obtained film samples were subjected to (Evaluation 1), (Evaluation 2) and (Evaluation 3) of Example 1 and (Evaluation 7) of Example 8 and additionally subjected to evaluation of the following item.

(Evaluation 8) Coating Film Surface Unevenness

An oily black ink was applied to the back surface of each antireflection film, and how the light from a three-wave fluorescent lamp was reflected thereon was observed with an eye in a dark room. The color tint unevenness of reflected light was evaluated according to the following criteria.

◯: Unevenness was not recognized even when very carefully observed.

Δ◯: Unevenness was slightly recognized but within the allowable range.

Δ: Faint unevenness was recognized.

X: Unevenness recognizable at the first glance was present.

The evaluation results are shown in Table 5

TABLE 5

| No. | Segregation of Fine Particle in Film SP Value | Segregation of Fine Particle in Film SA Value | Scratch Resistance Steel Wool | LogSR | Coating Film Surface Unevenness | Remarks |
|---|---|---|---|---|---|---|
| 1001 | — | — | X | 14.1 | ○ | Comparison |
| 1002 | 0 | 0 | ○ | 8.1 | Δ | Invention |
| 1003 | 0 | 0 | ○ | 8.3 | ○ | Invention |
| 1004 | — | — | ΔX | 8.1 | ○Δ | Comparison |

The results in Table 5 reveal the followings.

In Samples 1002 and 1003 where Coating Solution A or G for electrically conducting layer was coated, the SP value and SA value fall within the scope of the present invention and the inorganic fine particle is segregated to the lower part in the layer. These samples have a low surface resistance value and are excellent in the dust resistance and scratch resistance. Also, Sample 1003 using a mixture of a high refractive index particle (electrically conducting particle) and a low refractive index particle (hollow silica) is improved in the coating film surface unevenness.

EXAMPLE 11

The following antireflection film with an antistatic layer was produced.

(Preparation of Coating Solution H for Electrically Conducting Layer)

9.0 Parts by mass of a mixture of dipentaerythritol pentaacrylate and dipentaerythritol hexaacrylate (DPHA, produced by Nippon Kayaku Co., Ltd., average molecular weight: about 560), 1.0 part by mass of photoradical generator Irgacure 369 (trade name), 14.0 parts by mass of cyclohexanone, 10.0 parts by mass of methoxypropanol and 10.0 parts by mass of butoxyethanol were mixed with 100 parts by mass of antimony-doped tin oxide-containing liquid dispersion SNS-10M (inorganic content: 19.7%, dispersant: 10.7% (partially bonded to the particle through a covalent bond), solvent: methyl ethyl ketone, produced by Ishihara Sangyo Kaisha, Ltd.), and the resulting mixed solution was diluted with methyl ethyl ketone to give a solid content concentration of 7.0%, thereby preparing Coating Solution G for electrically conducting layer.

(Preparation of Coating Solution C for Hardcoat Layer)

In Coating Solution A for hardcoat layer, 0.12 mass % of Bright 20GNR4.6-EH (benzoguanamine-melamine-formaldehyde condensate spherical powder plated with nickel and gold, produced by Nippon Chemical Industrial Co., Ltd.) was further dispersed to prepare Coating Solution C for hardcoat layer.

(Production of Laminate Film 1101 of TAC/Antistatic Layer/Hardcoat Layer)

A 80 μm-thick triacetyl cellulose film (TAC-TD80U, produced by Fuji Photo Film Co., Ltd.) in a roll form was unrolled, and Coating Solution G for antistatic layer was coated thereon by using a microgravure roll and a doctor blade. After drying at 90° C. for 30 seconds, the coated layer was cured by irradiating thereon an ultraviolet ray at a radiation illuminance of 100 mW/cm² and an irradiation energy amount of 100 mJ/cm² with use of an air-cooled metal halide lamp of 160 W/cm (manufactured by Eye Graphics Co., Ltd.) in an oxygen concentration of 0.1% under nitrogen purging, thereby forming a layer having a thickness of 90 nm. The resulting film was taken up.

On the thus-obtained antistatic layer, Coating Solution C for hardcoat layer was coated and after drying at 60° C. for 150 seconds, the coated layer was cured by irradiating thereon an ultraviolet ray at a radiation illuminance of 120 mW/cm² and an irradiation energy amount of 120 mJ/cm² with use of an air-cooled metal halide lamp of 160 W/cm (manufactured by Eye Graphics Co., Ltd.) in an oxygen concentration of 0.1% under nitrogen purging, thereby forming a layer having a thickness of 6 μm. The resulting film was taken up. The surface roughness of the thus-obtained Laminate Film 1001 was Ra=0.21 μm and Rz=1.40 μm, and the haze was 36%.

(Production of Laminate Film 1102 of TAC/Hardcoat Layer/Antistatic Layer)

A 80 μm-thick triacetyl cellulose film (TAC-TD80U, produced by Fuji Photo Film Co., Ltd.) in a roll form was unrolled, and Coating Solution A for hardcoat layer was directly coated thereon and after drying at 60° C. for 150 seconds, the coated layer was cured by irradiating thereon an ultraviolet ray at a radiation illuminance of 100 mW/cm² and an irradiation energy amount of 100 mJ/cm² with use of an air-cooled metal halide lamp of 160 W/cm (manufactured by Eye Graphics Co., Ltd.) in an oxygen concentration of 0.1% under nitrogen purging, thereby forming a layer having a thickness of 6 μm. The resulting film was taken up.

On the thus-obtained hardcoat layer, Coating Solution H for antistatic layer was controlledly coated to have a film thickness of 90 nm. The drying conditions of the electrically conducting layer were 90° C. and 30 seconds, and the ultraviolet curing conditions were such that an air-cooled metal halide lamp of 120 W/cm (manufactured by Eye Graphics Co., Ltd.) was used at a radiation illuminance of 120 mW/cm² and an irradiation energy amount of 120 mJ/cm² while purging the system with nitrogen to provide an atmosphere having an oxygen concentration of 0.1 vol % or less. The surface roughness of the thus-obtained Laminate Film 1002 was Ra=0.25 μm and Rz=1.60 μm, and the haze was 37%.

The low refractive index layer of Example 1 was coated and cured on each of Laminate Films 1101 and 1102. As a result of evaluations following Example 1, it was found that in the case of samples using the low refractive index layer of the present invention, an antireflection film excellent in the scratch resistance and antifouling property can be obtained. Also, the sample obtained by coating the low refractive index layer on Laminate Film 1101 exhibited LogSR of 9.1 to 9.3, and the sample obtained by coating the low refractive index on Laminate Film 1102 exhibited LogSR of 8.0 to 8.2, revealing good dust resistance.

The invention claimed is:

1. An optical film comprising: a support; and an antireflection layer formed by coating a composition containing fine particles and a binder,
wherein the thickness of the antireflection layer is from 10 to 500 nm,
wherein a SP value ((B/A)×100)), which is an average ratio of an average particle filling factor (B) to average particle filling factor (A), is 90% or less,
wherein the average particle filling factor (A) is an average particle filling factor in the entirety of the antireflection layer, and
the average particle filling factor (B) is an average particle filling factor in a region of 30% of the thickness of the antireflection layer on the upper side opposite the support.

2. The optical film as claimed in claim 1, wherein in the region of 30% of the film thickness on the upper side opposite the support, a percentage (SA value) of a region containing a fine particle aggregate is 45% or less.

3. The optical film as claimed in claim 1, wherein the fine particles are inorganic oxide fine particles, and surfaces of the fine particles are treated with a compound capable of forming a covalent bond with the fine particles.

4. The optical film as claimed in claim 1 wherein the fine particles mainly comprise at least one selected from the group consisting of silicon dioxide, tin oxide, indium oxide, zinc oxide, zirconium oxide and titanium oxide.

5. The optical film as claimed in claim 1, wherein the fine particles are hollow silica.

6. The optical film as claimed in claim 1, wherein the fine particles comprise a mixture of at least one fine particle having a refractive index of 1.60 to 2.60 and at least one fine particle having a refractive index of 1.15 to less than 1.60.

7. The optical film as claimed in claim 1, wherein the binder comprises at least one photopolymerizable compound.

8. The optical film as claimed in claim 1, wherein the binder comprises a thermosetting resin.

9. The optical film as claimed in claim 1, wherein the binder comprises at least a compound containing one of fluorocarbon and dimethylsiloxane.

10. The optical film as claimed in claim 1, wherein the binder comprises at least one polymerizable composition having a weight average molecular weight of 5,000 or more and at least one polymerizable composition having a weight average molecular weight of less than 5,000.

11. A multilayer antireflection film which is an optical film claimed in claim 1, wherein the support is a transparent support, and the optical film is obtained by stacking at least a hardcoat layer and a low refractive index layer on the support.

12. A multilayer antireflection film which is the optical film claimed in claim 1, wherein at least one antistatic layer is provided between a low refractive index layer and the support.

13. A method for producing an optical film claimed in claim 1, wherein the coating composition comprising fine particles and the binder comprises at least two volatile solvents.

14. A polarizing plate comprising an optical film claimed in claim 1.

15. An image display comprising an optical film claimed in claim 1.

* * * * *